United States Patent
Rubtsov et al.

(10) Patent No.: US 12,411,250 B2
(45) Date of Patent: Sep. 9, 2025

(54) METHOD AND APPARATUS FOR FAST SEARCHING GLOBAL NAVIGATION SATELLITE SYSTEM SIGNALS

(71) Applicant: Topcon Positioning Systems, Inc., Livermore, CA (US)

(72) Inventors: Dmitry Anatolyevich Rubtsov, Moscow (RU); Leonid Victorovich Purto, Moscow (RU); Andrey Vladimirovich Veitsel, Moscow (RU); Victor Andreevich Prasolov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 543 days.

(21) Appl. No.: 17/753,821

(22) PCT Filed: Aug. 31, 2021

(86) PCT No.: PCT/RU2021/000375
§ 371 (c)(1),
(2) Date: Mar. 15, 2022

(87) PCT Pub. No.: WO2023/033667
PCT Pub. Date: Mar. 9, 2023

(65) Prior Publication Data
US 2023/0305168 A1    Sep. 28, 2023

(51) Int. Cl.
*G01S 19/30*    (2010.01)
*G01S 19/29*    (2010.01)
(Continued)

(52) U.S. Cl.
CPC ........... *G01S 19/30* (2013.01); *G01S 19/29* (2013.01); *G01S 19/37* (2013.01); *G01S 19/24* (2013.01)

(58) Field of Classification Search
CPC .......... G01S 19/29; G01S 19/30; G01S 19/37; G01S 19/24
(Continued)

(56) References Cited

U.S. PATENT DOCUMENTS 6,118,808 A  *  9/2000  Tiemann ............... G01S 5/0036
                                                  375/E1.031
7,395,155 B2 *  7/2008  Hsu ........................ G01S 19/29
                                                      370/335
(Continued)

FOREIGN PATENT DOCUMENTS

CN     1522507 A    8/2004
CN     1543714 A    11/2004
(Continued)

OTHER PUBLICATIONS

International Search Report and Written Opinion mailed May 19, 2022 in connection with International Application No. PCT/RU2021/000375, filed Aug. 31, 2021, 10 pgs.
(Continued)

*Primary Examiner* — Chuong P Nguyen
(74) *Attorney, Agent, or Firm* — Chiesa Shahinian & Giantomasi PC

(57) ABSTRACT

A method and apparatus for fast searching GNSS signals performed on a GNSS receiver includes the steps of receiving a signal having a known pseudo random noise code. State information of a code generator is stored when a pseudo random noise code is generated. Several NCO, including a Doppler NCO are used to search GNSS signal for several supposed Doppler's simultaneously. A search window associated with the received signal is reviewed a first time to identify a source of the received signal. After it is determined if a source of the received signal can be identified, the state information is loaded into the code generator prior to reviewing the search window a second
(Continued)

time etc. Search windows is shifting by all length PRN Code. The loading of state information allows sequential review of the search window without re-adjustment of a fast search module which speeds the process of analyzing the received signals.

17 Claims, 16 Drawing Sheets

(51) Int. Cl.
*G01S 19/37* (2010.01)
*G01S 19/24* (2010.01)

(58) Field of Classification Search
USPC ............. 342/357.68, 357.69, 357.77, 357.63
See application file for complete search history.

(56) References Cited

U.S. PATENT DOCUMENTS

| | | | | |
|---|---|---|---|---|
| 7,630,430 | B2 * | 12/2009 | Bochkovskiy | H04B 1/707 375/150 |
| 7,852,264 | B2 * | 12/2010 | Zaruba | G01S 19/37 342/357.69 |
| 8,111,735 | B2 * | 2/2012 | Chen | G01S 19/30 375/150 |
| 8,170,086 | B2 * | 5/2012 | Abraham | G01S 19/256 375/150 |
| 8,193,980 | B2 | 6/2012 | Nayyar | |
| 8,391,339 | B2 * | 3/2013 | Wang | H04B 1/7085 375/150 |
| 8,630,332 | B2 | 1/2014 | Young | |
| 8,681,042 | B2 * | 3/2014 | Martin | G01S 19/30 342/357.59 |
| 8,842,717 | B2 * | 9/2014 | King | H04B 1/7077 375/150 |
| 9,596,610 | B1 | 3/2017 | Borras et al. | |
| 10,281,556 | B2 | 5/2019 | Mahmood et al. | |
| 10,809,385 | B2 * | 10/2020 | Rubtsov | G01S 19/33 |
| 10,880,029 | B2 | 12/2020 | Lennen | |
| 10,942,280 | B2 * | 3/2021 | Anderson | G01S 19/37 |
| 10,943,461 | B2 | 3/2021 | Kleinbeck et al. | |
| 10,945,146 | B2 | 3/2021 | Kleinbeck et al. | |
| 2002/0193108 | A1 | 12/2002 | Robinett | |
| 2003/0012874 | A1 | 1/2003 | Lange et al. | |
| 2003/0081660 | A1 | 5/2003 | King et al. | |
| 2004/0095275 | A1 | 5/2004 | Warloe et al. | |
| 2008/0232441 | A1 | 9/2008 | Mester et al. | |
| 2009/0189808 | A1 | 7/2009 | Chen et al. | |
| 2010/0159958 | A1 * | 6/2010 | Naguib | G01S 5/021 455/457 |
| 2011/0181467 | A1 | 7/2011 | Samavati et al. | |
| 2012/0038512 | A1 | 2/2012 | Geswender et al. | |
| 2013/0035099 | A1 | 2/2013 | Boejer et al. | |
| 2014/0028499 | A1 | 1/2014 | Yeh et al. | |
| 2016/0245923 | A1 | 8/2016 | Badke | |
| 2018/0356531 | A1 | 12/2018 | Naveen et al. | |
| 2021/0055425 | A1 | 2/2021 | Guo et al. | |
| 2021/0226776 | A1 | 7/2021 | Falk | |
| 2022/0276389 | A1 * | 9/2022 | Yu | G01S 19/21 |
| 2024/0069215 | A1 * | 2/2024 | Rubtsov | G01S 19/37 |

FOREIGN PATENT DOCUMENTS

| | | |
|---|---|---|
| CN | 111399004 A | 7/2020 |
| CN | 112394374 A | 2/2021 |
| CN | 113141342 A | 7/2021 |
| EP | 3413089 B1 | 10/2019 |
| JP | 2005525005 A | 8/2005 |
| JP | 2013518281 A | 5/2013 |

OTHER PUBLICATIONS

First Office Action mailed Feb. 12, 2025 in connection with Chinese Patent Application No. 202180103206.5, filed Apr. 10, 2024, 13 pgs. (including translation).

First Office Action mailed Sep. 7, 2024 in connection with Chinese Patent Application No. 202180101963.9, filed Feb. 28, 2024, 12 pgs. (including translation).

Extended European Search Report mailed May 8, 2025, in connection with European Patent Application No. 21960762.9, filed May 1, 2024, 9 pgs.

Office Action mailed Jul. 1, 2025, in connection with Japanese Patent Application No. 2024-513488, filed Feb. 28, 2024, 9 pgs. (including translation).

* cited by examiner

A Block-diagram of Navigation Receiver

Example 1, Control Counters Adjustment

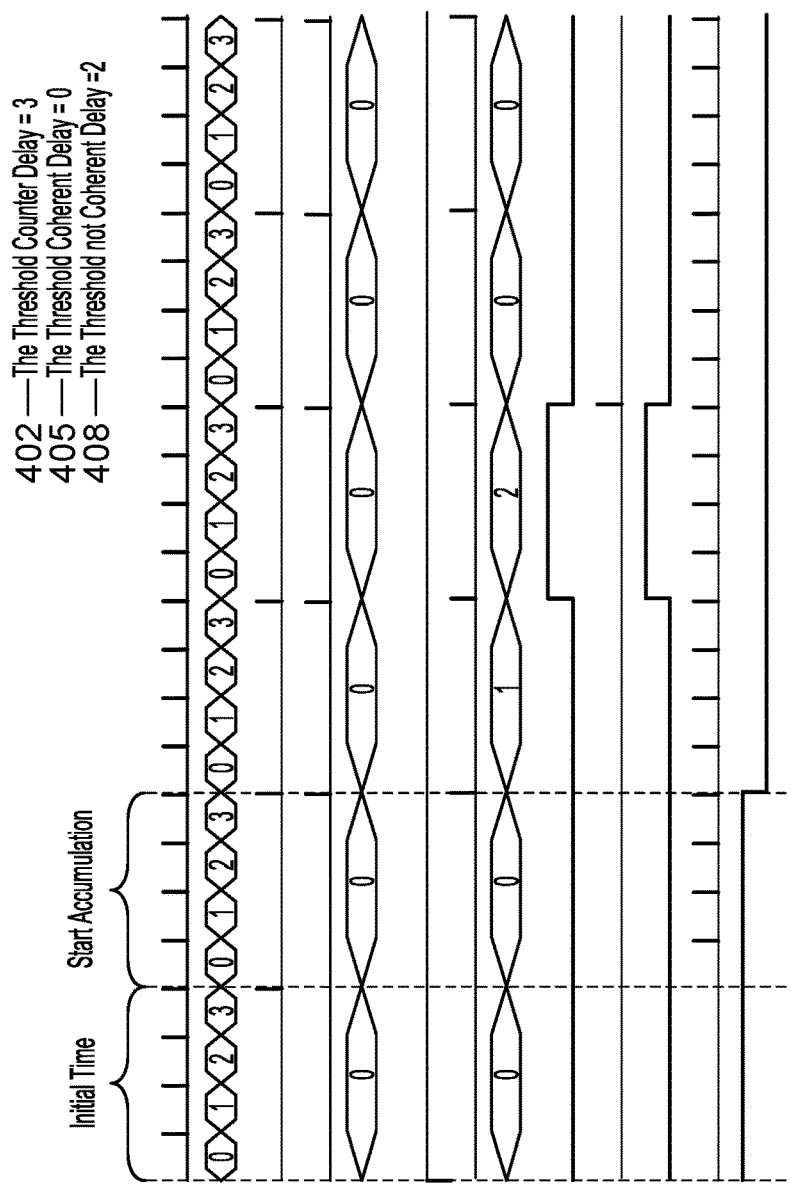
FIG. 4C Example 2, Control Counters Adjustment

Example 3. Control Counters Adjustment

Non-Accumulation Mode in Operation of the Control Accumulation Unit

METHOD AND APPARATUS FOR FAST SEARCHING GLOBAL NAVIGATION SATELLITE SYSTEM SIGNALS

FIELD OF THE INVENTION

The present disclosure relates to navigation receivers and methods of signal processing and, in particular, to fast searching Global Navigation Satellite Signals (GNSS) and further processing signals of different systems such as the Global Positioning System (GPS), Global Navigation Satellite System (GLONASS), and GALILEO satellite system, etc.

BACKGROUND

Global Navigation Satellite Systems (GNSS) use satellites to broadcast radio signals that are acquired by receivers. The receivers use the acquired signals in order to determine the location of the receiver. GNSS signals are often searched for using code delay and Doppler offset. Defining search window S as the number of simultaneously considered delays viewed by a search unit, the simplest way to search a plurality of channels uses components comprising a code generator, multiple numerically-controlled oscillators (NCO) including a code NCO (CRNCO) and an intermediate frequency NCO (IFNCO), and a correlator. Channels are configured to search one signal for one Doppler offset and, when initializing, a different code delay needs to be set for different channels. To search for a certain Doppler offset, a channel should be re-started/reset. This method requires a great number of channels wherein each is associated with its own correlator, code generator, CRNCO and IFNCO.

SUMMARY

The present disclosure relates generally to global navigation satellite systems (GNSS) and, more particularly, to a receiver for a GNSS system. In one embodiment, an apparatus for fast searching radio navigational signals having a known pseudo-random noise (PRN) code includes an antenna for receiving signals having a known PRN code. A radio frequency path is configured to receive the radio signals from the antenna and move those signals to an intermediate frequency signal. A numerically controlled oscillator is configured to output pulses at a period of PRN elements and an analog to digital converter (ADC) is configured to sample the intermediate frequency signal. A digital mixer is configured to receive signals from the ADC and output a sampled signal at a zero frequency. A decimator is configured to receive the sampled signal at the zero frequency from the digital mixer. A correlator is configured to calculate a convolution of shifted array of inputs received from the decimator via a pair of quantization units with non-shifted array of PRN code elements and a memory unit is configured to store a result of a value output from the correlator. A code generator is configured to calculate a new element according to the pulses output from the numerically controlled oscillator. An intermediate frequency numerically controlled oscillator is configured to output an intermediate frequency for the intermediate frequency signal. A fast search numerically controlled oscillator (FSNCO) outputting pulses at a preset period. In response to the output pulses of the FSNCO: the decimator is further configured to generate a new output sample, the correlator is further configured to shift a shifted array of input samples to include the new output sample, the correlator is further configured to shift a shifted array of PRN code elements to include a current state of a PRN code generator's output, the correlator is further configured to copy the shifted array of PRN code elements to non-shifted array of PRN code elements one time during S pulses of the numerically controlled oscillator, the correlator is further configured to calculate a new convolution value and a metric of the new convolution value, a corrector is configured to compare the metric of the new convolution value with the stored result, and, if the new convolution value is greater than the stored result, then the new convolution value is stored instead of the stored result, and a fast search module is configured to determine the availability of a signal with a known PRN code and its parameters in the received radio signal once every S*k pulses for at least one value of the stored result.

In one embodiment, a Doppler numerically controlled oscillator (DopNCO) is configured to output a Doppler phase once in S pulses of the FSNCO. In this embodiment, at least D−1 digital phase shifters, where D−1 is an even integer, rotate the new convolution value into a phase proportional to the phase at the DopNCO output. The memory unit is further configured to store D*S values. In this embodiment, for each pulse of the FSNCO the following operations are performed: in each of D−1 phase shifters, the value output from the correlator is rotated into a phase proportional to the phase of DopNCO output to generate D−1 rotated phase convolution results, obtained D−1 rotated convolution results as well as a non-rotated convolution result are added to previous values in the memory unit configured to store D*S values, and the obtained D results of adding are stored in the memory at the same address, and the metric of the new convolution value is calculated according to the result of adding the rotated/non-rotated convolution result and the previous values in the memory unit configured to store D*S values.

In one embodiment of the apparatus, at Kth period of S pulses, obtained D−1 metrics based on the obtained D−1 rotated convolution results, are input to the memory unit configured to store D*S values. Also at Kth period of S pulses, obtained metrics based on non-rotated results are input to the memory unit configured to store D*S values for storing the result, and once every S*k pulses, the availability of a signal with a known PRN code and its parameters in the received radio signals is determined.

In one embodiment of the apparatus, a reload generator stores the state of a code generator in S+1 pulse, and, at S*k+1 pulse when at the end of the incoherent period, the reload generator loads the stored state of the code generator into the code generator.

In one embodiment, the apparatus further comprises a coherent counter and a not-coherent counter, wherein the coherent counter sums convolution values for each S, and the not-coherent counter is used for S if needed and the values obtained are stored in the memory unit configured to store D*S values.

In one embodiment, the apparatus further comprises a control accumulator comprising N cyclically shift registers that are moved forward at a rate of the FSNCO, the input to the control accumulator set to 0 based on a configuration.

In one embodiment of the apparatus, addition of estimates during data sorting comprise the results of Doppler metrics during the period S*k and Doppler metrics for each offset are separately sorted.

In one embodiment, a method fast searching radio navigational signals includes the step of receiving radio signals at an antenna, the radio signals having a known PRN code. The radio signals from the antenna are transmitted to an RF path which then transmits the signals using an intermediate frequency. The intermediate frequency signal is sampled at an ADC. A digital mixer generates a sampled signal at a zero frequency based on signals received from the ADC. A shifted array of inputs is transmitted from a decimator in response to the decimator receiving the sampled signal at the zero frequency. A convolution of the shifted array inputs received from the decimator via a pair of quantization units is calculated with a non-shifted array of PRN code elements. A result of a value output from the correlator is stored in a first memory unit. A code generator calculates a new element according to pulses output from the numerically controlled oscillator. Pulses at a preset period are output from a fast search numerically controlled oscillator. A decimator generates a new output sample based on the pulses at the preset period. The correlator shifts a shifted array of input samples to include the new output sample. The correlator also shifts a shifted array of PRN code elements to include a current state of a PRN code generator's output. The correlator also copies the shifted array of PRN code elements to non-shifted array of PRN code elements one time during S pulses of the numerically controlled oscillator. The correlator also calculates a new convolution value and a metric of the new convolution value. A corrector compares the metric of the new convolution value with the stored result, and, if the new convolution value is greater than the stored result, then the new convolution value is stored instead of the stored result. A fast search module determines the availability of a signal with a known PRN code and its parameters in the received radio signal once every S*k pulses for at least one value of the stored result.

In one embodiment, a method for fast searching GNSS signals performed on a GNSS receiver includes the steps of receiving a signal having a known pseudo random noise code. State information of a code generator is stored when a pseudo random noise is generated. The pseudo random noise is associated with the pseudo random noise code. A search window associated with the received signal is reviewed a first time to identify a source of the received signal. After it is determined if a source of the received signal can be identified, the state information is loaded into the code generator prior to reviewing the search window a second time. The loading of state information allows sequential review of the search window without re-adjustment of a fast search module which speeds the process of analyzing the received signals. In one embodiment, the search window is shifting by all length PRN code.

In one embodiment, the received signal is processed by a control accumulator using a plurality of multiplexed signals on a fast search numerically controlled oscillator frequency. One of the plurality of multiplexed signals can be zeroed. This zeroing causes the zeroed signal to be ignored in the analysis of the plurality of signals. In one embodiment, the received signal is multiplied by an intermediate frequency prior to the determining if a source of the signal can be identified. In one embodiment, a rotation angle is added to the received signal. The rotation angle can be based on a Doppler numerically controlled oscillator. The results generated while reviewing the search window can be stored in a coherent mode or a not-coherent mode. The not-coherent mode allows searching for signals with superimposed data.

In one embodiment, at the end of the incoherent period and when the coherent counter counts K periods of S pulses, all not-coherent metric are added, and the result being read by the CPU.

In one embodiment, at the end of the incoherent period and when the coherent counter counts K periods of S pulses, the availability of a signal with a known PRN code and its parameters in the received radio signals is determined among D*S not-coherent metrics, and the result being read by the CPU,

BRIEF DESCRIPTION OF THE DRAWINGS

FIG. 4C shows an additional example of adjustment of the control counters shown in FIG. 4A and FIG. 2;

DETAILED DESCRIPTION

A method and apparatus for fast searching of satellite signals comprises a receiver receiving and processing signals transmitted from global navigation satellite system satellites.

Figure 1:
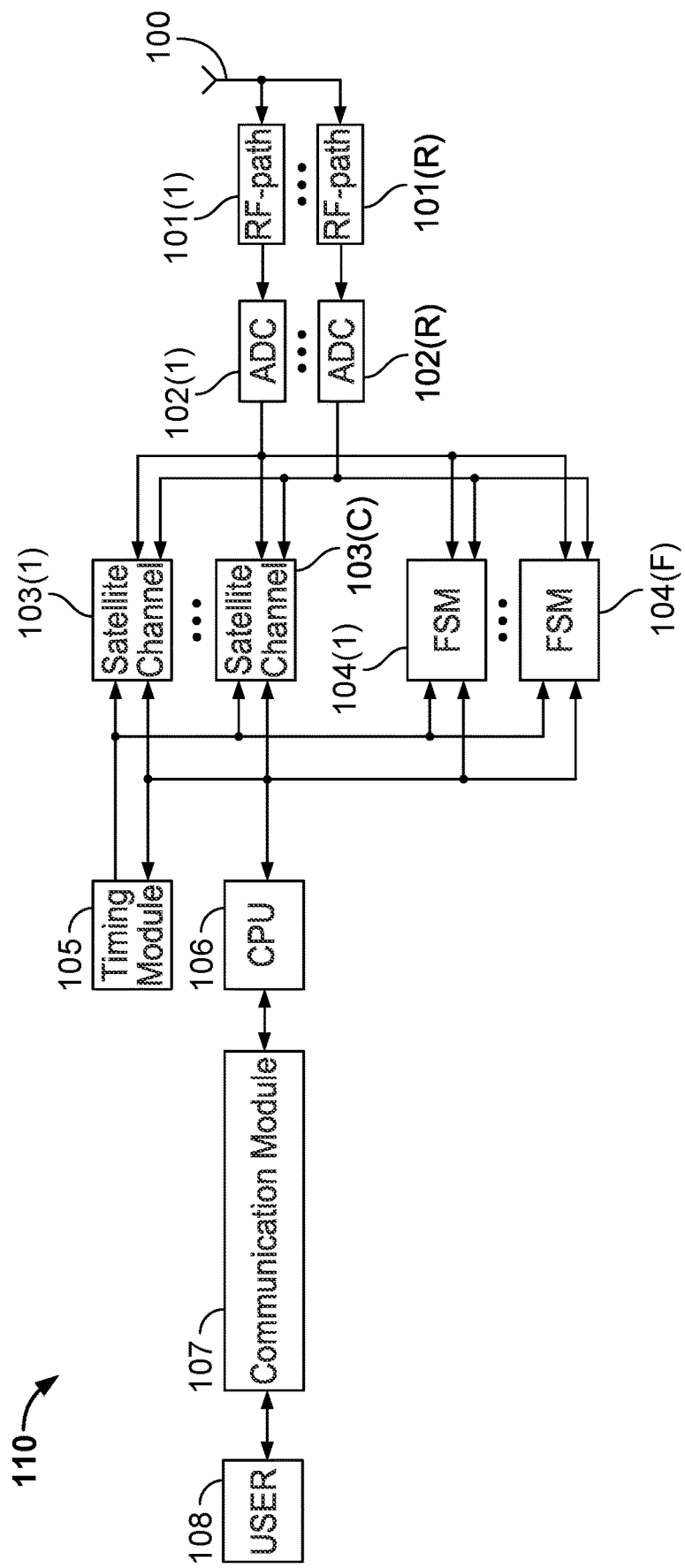
FIG. 1 shows a block diagram of a navigation receiver.

FIG. 1 shows receiver 110 for receiving and processing satellite signals. In one embodiment, a satellite signal including pseudo random noise ("PRN") is received by antenna 100. The received signal passes through RF-path 101(1) to analog to digital convertor (ADC) 102(1). From ADC 102(1), the converted signal is transmitted to satellite channel 103(1) and Fast Search Module (FSM) 104(1). Satellite channel 103(1) and FSM 104(1) receive a digitized signal transferred to an intermediate frequency. FSM 104(1) implements signal searching based on the intermediate frequency and a reference code delay. Satellite channel 103(1) processes the digitized signal from ADC 102(1). It should be noted that multiple sets of RF paths 101(1) to 101(R), ADC 102(1) to 102(R), satellite channel 103(1) to 103(C), and FSM 104(1) to 104(F) can be utilized. It should be noted that in cases where multiple similar paths are shown in a figure, only one channel may be described and the other, similar paths, should be understood to be configured and function similarly to the path described.

Timing module 105 synchronizes control of FSM 104(1) and satellite channel 103. Timing module 105 counts out the pre-set number of clock pulses and generates interruption in central processing unit (CPU) 106. CPU 106 controls timing module 105, FSM 104 and satellite channel 103. CPU 106 processes the information from FSM 104 and Channel 103 and transmits data to user 108 via communication module 107.

Figure 2:
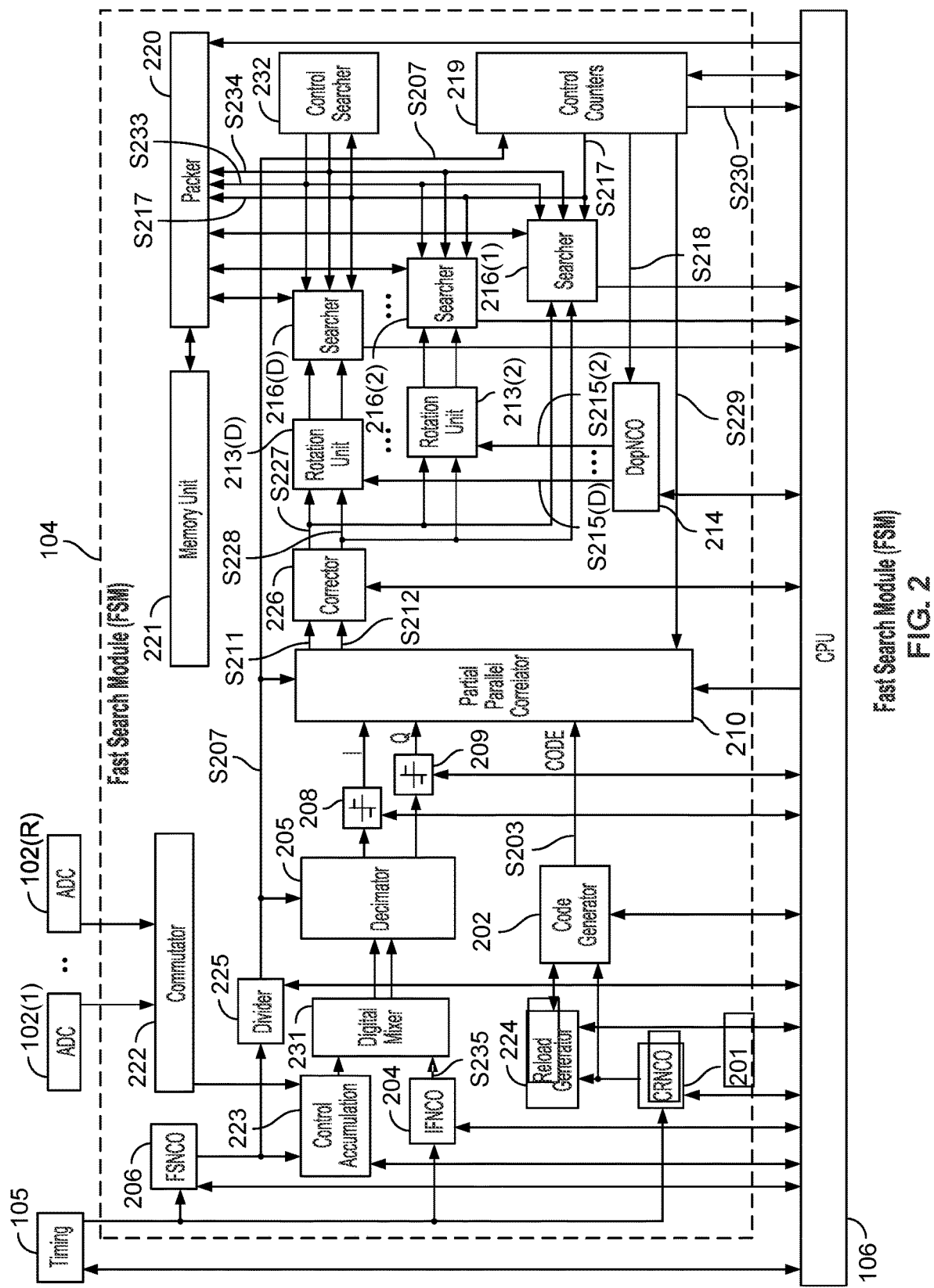
FIG. 2 shows details of the fast search module shown in FIG. 1.

FIG. 2 shows details of FSM 104(1) shown in FIG. 1. Although only the configuration and operation of FSM104 (1) is described herein, additional fast search modules used in receiver 110 are configured and operate similarly. In one embodiment, FSM 104(1) comprises the following components which interact with various signals. FSM 104(1) includes a code rate numerically controlled oscillator (NCO) 201 (referred to as a CRNCO), code generator 202, intermediate frequency NCO (IFNCO) 204, reference code (reference Pseudo Random Noise (PRN) sequence) S203, decimator 205, Fast Search NCO (FSNCO) 206, divided fast search frequency S207, quantization unit 208, quantization unit 209, partial parallel correlator 210, the number of "units 1" for component I S211, the number of "units 1" for component Q S212, rotation unit 213, doppler NCO (DopNCO) 214, rotated signal (D . . . 2) S215, searcher 216, signals from control counters S217, signal of ending the operation of the delay counter (equal to S403) S218, control counters 219, packer 220, memory unit 221, commutator 222, control accumulator 223, reload generator 224, divider 225, corrector 226, correlation signal of component I S227, correlation signal of component Q S228, signal of ending the operation of the delay counter via the initial unit; (equal to S417) S229, signal of ending the operation of the not-coherent counter S230, digital mixer 231, control searcher 232, signal of reading from the memory unit S233, signal of writing to the memory unit S234, and intermediate frequency signal S235.

In one embodiment, CPU 106 controls the following units within FSM 104: code rate NCO (CRNCO) 201, code generator 202, fast search NCO (FSNCO) 206, quantization unit 208, quantization unit 209, partial parallel correlator 210, Doppler NCO (DopNCO) 214, searcher 216, control counters 219, packer 220, commutator 222, control accumulator 223, reload generator 224, divider 225, and corrector 226.

In one embodiment, FSM 104 requires initialization prior to searching for a signal selected by CPU 106. In one embodiment, the following operations are performed during initialization. Commutator 222 electrically connects to one of ADC 102(1) though 102(R) based on a desired signal to be analyzed. Control accumulation 223 is adjusted as needed. The frequency of the pseudo random noise generator (PRN) in CRNCO 201 is set and divider 225 is adjusted, if needed. Generator code 202 and reload generator 224 are adjusted, if needed. Intermediate frequency S235 in the oscillator/generator IFNCO 204 is set. The fast search frequency in the oscillator FSNCO 206 is set. The Doppler frequency in the oscillator DopNCO 214 is set. Values for units 402, 405, and 408 are adjusted in Control Counter 219. The settings in quantizers 208 and 209 are adjusted. And corrector 226, packer 220, and partial parallel correlator 210 are adjusted.

After initialization FSM 104 operates as follows according to an embodiment. IFNCO 204, CRNCO 201, and FSNCO 206 operate based on a signal from timing module 105. IFNCO 204 generates intermediate frequency signal S235 which is fed to digital mixer 231. A fast search frequency from FSNCO 206 is input to control accumulation 223 and divider 225. Then a signal from the selected ADC 102 is fed to control accumulation 223 from commutator 222. If needed, in control accumulator 223 the input signal is set to 0. The signal from the output from control accumulator 223 is input to digital mixer 231. The fast search frequency is divided by divider 225, if necessary. Divider 225 then outputs the divided fast search frequency signal S207 which is input to decimator 205, partial parallel correlator 210, and control counters 219.

In digital mixer 231, the signal from Control Accumulator 223 and IFNCO 204 are multiplied and input to decimator 205. Decimator 205 receives the signals from digital mixer 231 and accumulates and stores them with divided fast search frequency S207. The stored signals are input to quantizers 208 and 209. Quantizers 208 and 209 output quantized signals which are input to partial parallel correlator 210.

Oscillator CRNCO 201 generates a code frequency which is input to reload generator 224 and code generator 202. Code generator 202 generates a reference code S203 which is a PRN code. Reload generator 224 is used for re-initialization of code generator 202 when necessary. Reference code signal S203 is input to partial parallel correlator 210. In one embodiment, code generator 202 can generate different code types including multiplexed code, BOC code, MBOC code, Memory Code and others. In one embodiment, unit 202 comprises a frequency code divider and a meander generator for generating a code.

Divided fast search frequency signal S207 is fed to the input of Control Counters 219. Control Counters 219 generates control signals S217, S218, S229 and S230. Signal S217 is fed to Control Searcher 232, Searcher 216 and Packer 220. Signal S218 is input to DopNCO 214, signal S229 is input to partial parallel correlator 210, and signal S230 is input to CPU 106.

Signals from control counters S217 include the following information: delay number S401, coherent counter threshold trigger signal S406, signal of finding MAX S412, signal of ending the operation of not-coherent counter S413, searcher's frequency S420, signal of starting accumulation process S421.

In partial parallel correlator 210, the signals from output 208, output 209, and signal S203 are used for correlating with divided fast search frequency S207. In-time-correlated signals S211 and S212 are output from partial parallel correlator 210.

Signals S211 and S212 are input to corrector 226. In corrector 226, mathematical operations depending on the correlation time in partial parallel correlator 210 are produced. Signals S227 and S228 are output from corrector 226.

Signal S218 is input to DopNCO 214. Based on signal S218, DopNCO 214 generates new rotated signals S215 (D . . . 2). Signals S227, S228 and S215 are input to rotation unit 213. In rotation unit 213, signal S215 is used to rotate signals S227, S228.

The signals input to searchers 216(D) and 216(2) include signals S217, S233, S234, S227, S228 (e.g., output from rotation units 213(D) and 213(2)).

Control searcher 232, generates a signal S233 when reading from memory unit 221 and generates a signal S234 when writing to memory unit 221. Control searcher 232 transmits information from memory unit 221 to Searcher 216(1), 216(2), . . . 216(D) and communicates with memory unit 221 via packer 220. Control searcher 232 generates signals S233 and S234 based on frequency transmitted by searcher S420, and control searcher 232 reads and writes to memory unit 221 via packer 220.

Searcher 216 performs coherent and not-coherent actions using signals S227 and S228 (output from rotation unit 213)

for each delay number S401 and the results are stored in memory unit 221. Temporary results of calculations are read and written from/to memory unit 221 via packer 220. Maximal results are also chosen and saved among all the results at the latest interval of coherent and not-coherent storing. The chosen results are metrics. CPU 106 reads the obtained metrics from searcher 216.

Figure 7A:
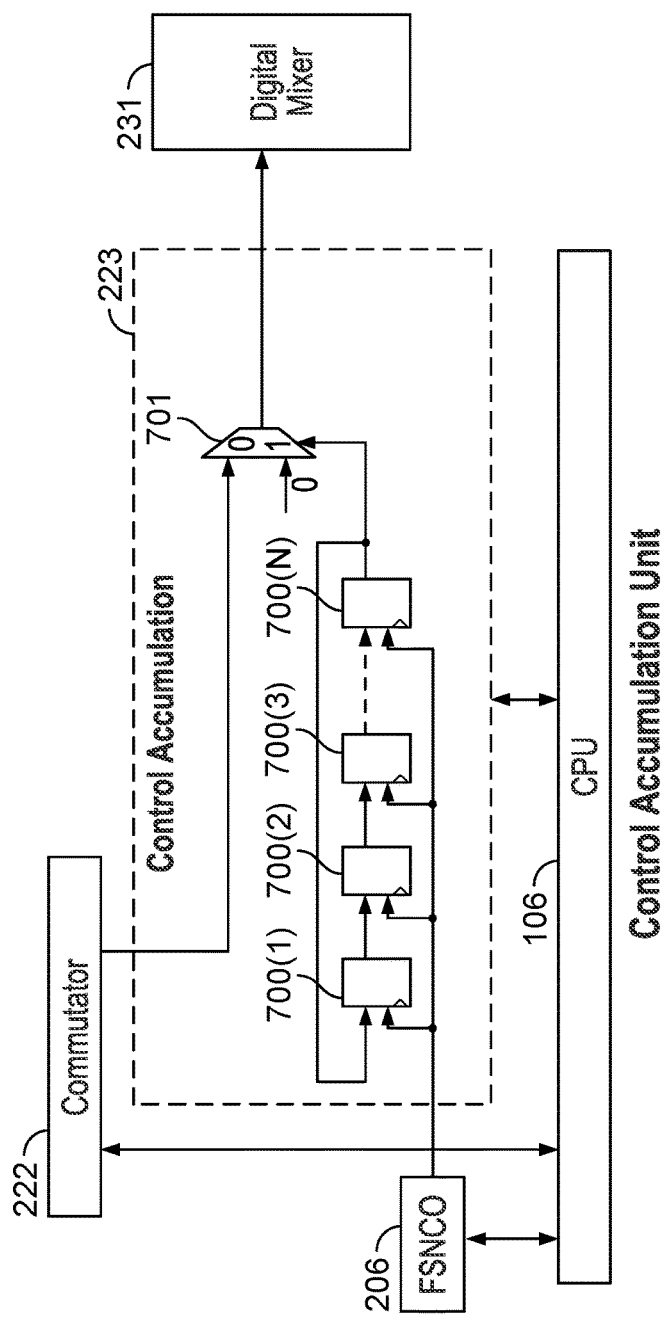
FIG. 7A shows details of the control accumulation unit shown in FIG. 2.

FIG. 7A shows details of control accumulation unit 223 shown in FIG. 2. Control accumulation unit 223 shown in FIG. 7A includes registers 700(1), 700(2), 700(3) through 700(N), and switch 701. In one embodiment, registers 700 are the cyclically shift registers.

In the given example, N=2M. Before operation, CPU 106 writes values in register 700. The output signal from FSNCO 206 is fed to unit 223. Using Fast Search Frequency, the value from 700(1) is written to 700(2), from 700(2) it is written to 700(3), from 700(N−1) it is further written to 700(N), and from 700(N) it is written to 700(1). The output of register 700(N) is connected to the input of 700(1) and to the control input of switch 701. The output of commutator 222 is fed to the input of switch 701. The output of switch 701 is connected to the input of Digital mixer 231. When 0 is available at the output of 700(N), the signal from the output of unit 222 is fed to the output of 701. When 1 is available at the output of 700(N), value "0" is fed to the output 701.

Figure 7B:
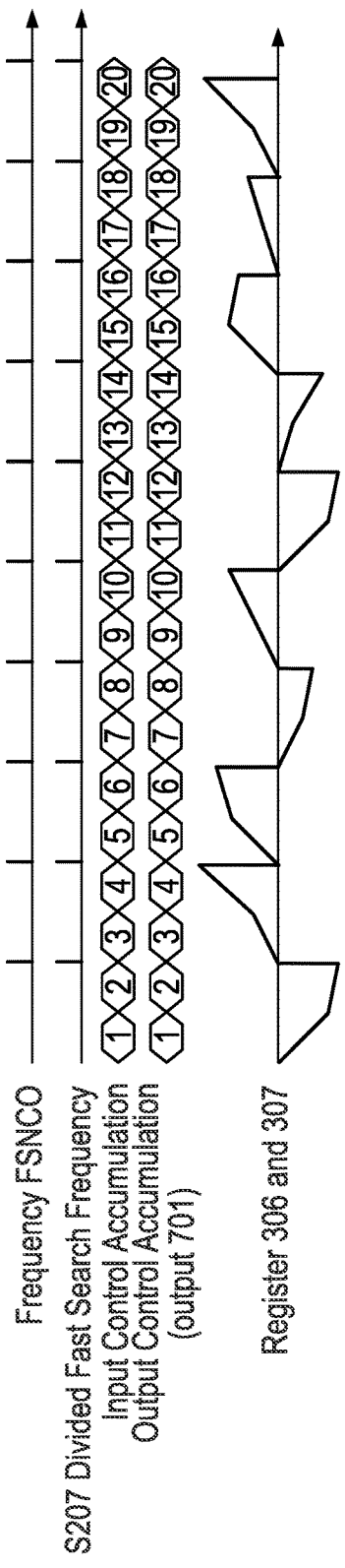
FIG. 7B shows standard operation of the control accumulation unit shown in FIG. 7A.

FIG. 7B shows a standard operation mode. Processor 106 writes 0 in all registers 700. A signal from commutator 222 is input to control accumulation unit 223. In the standard operational mode, a signal from the input to the output transmitted without any change. In this mode, Divider 225 lets the frequency FSNCO 206 pass without its dividing.

Figure 7C:
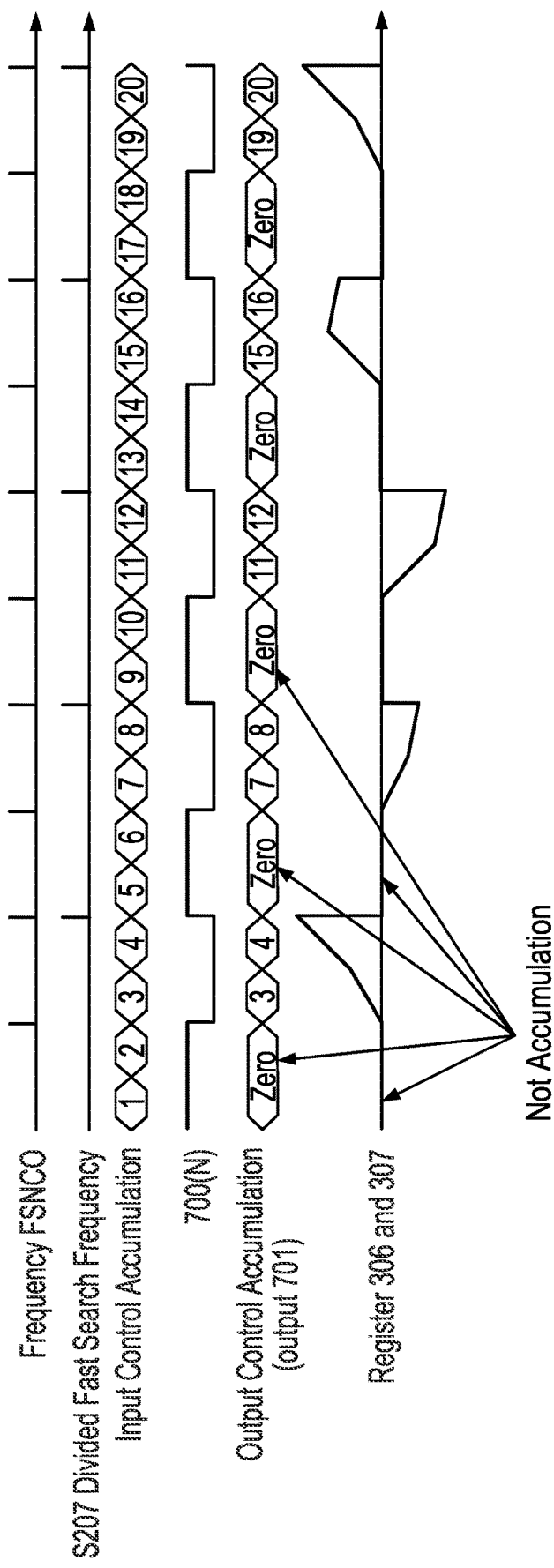
FIG. 7C shows a non-accumulation mode of operation of the control accumulation unit shown in FIG. 7A.

FIG. 7C shows a process of operating in a non-accumulation mode. In this embodiment, the number of registers 700 is equal to 4 identified as registers 700(1) 700(2), 700(3) and 700(4). Processor (CPU) 106 writes the following values into registers 700: 700(1)=0, 700(2)=1, 700(3)=0, 700(4)=1. As an example, the operational mode is described with the absence of one chip of FSNCO 206. A signal from commutator 222 is input to control accumulation unit 223. The input signal is set to zero using a chip of FSNCO 206. One chip of FSNCO 206 is equal to zero at the output, the next chip-signal at the output is equal to the input signal and so on. In this mode, divider 225 divides frequency FSNCO 206 into 2.

Figure 3:
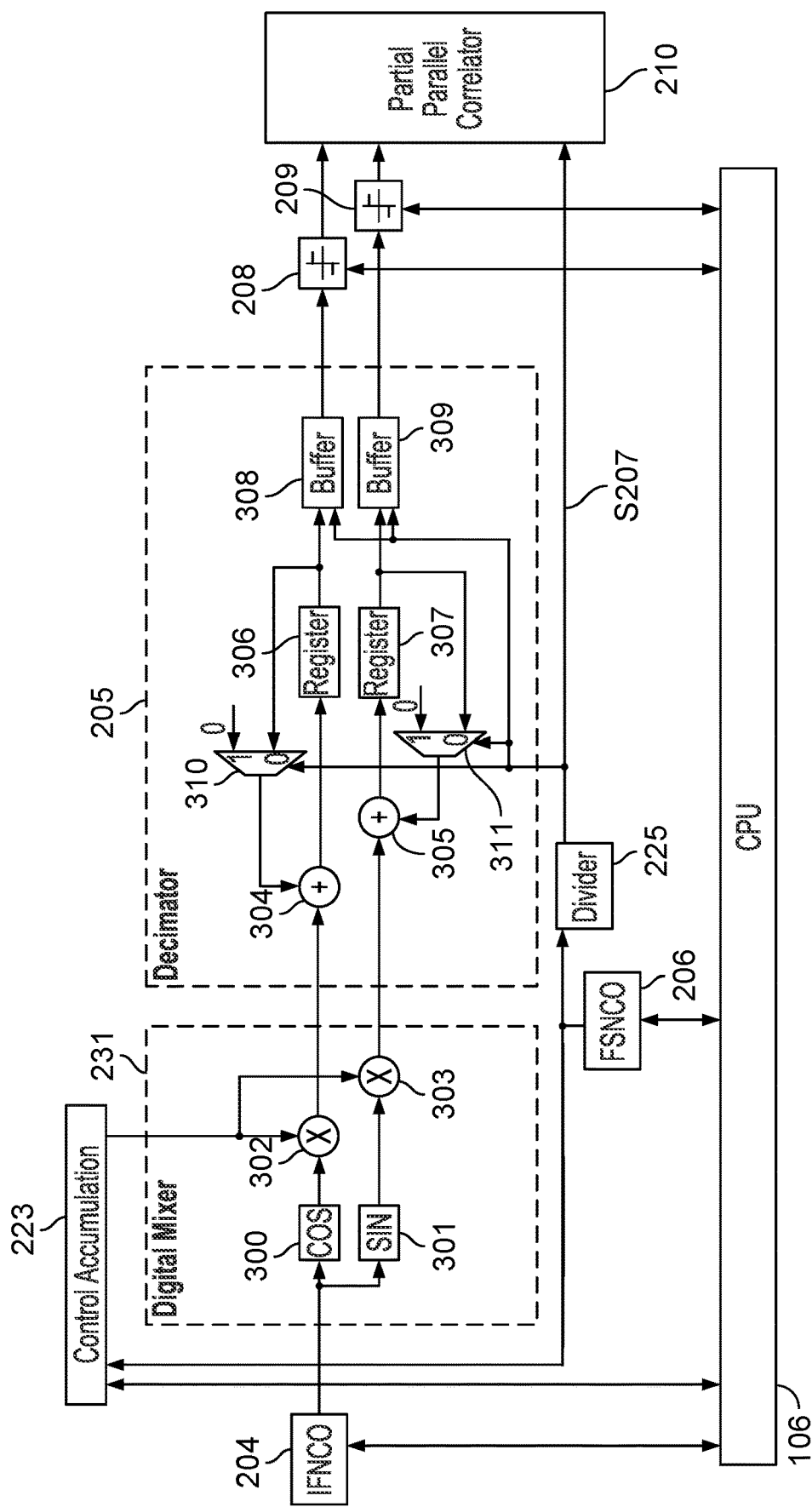
FIG. 3 shows details of the digital mixer and decimator shown in FIG. 2.

FIG. 3 shows details of digital mixer 231 and decimator 205. Digital mixer 231 comprises cosine unit 300, sine unit 301, multiplier 302, and multiplier 303. Decimator 205 comprises summing unit 304, summing unit 305, register 306, register 307, buffer 308, buffer 309, switch 310, and switch 311.

Digital mixer 231 transfers the digitized signal passed 233 to the zero frequency. Frequency IFNCO 204 is input to digital mixer 231. Frequency IFNCO 204 is input to cosine unit 300 and sine unit 301 of digital mixer 231. The output of Cosine unit 300 is input to multiplier 302, where it is multiplied by the output of control accumulation unit 223. The output of sine unit 301 is input to multiplier 303, where it is multiplied by the output of control accumulation unit 223. The outputs of units 302 and 303 are input to decimator 205.

The output of unit 302 is input to summing unit 304, where it is added to the output signal of register 306 passing through switch 310. The output of unit 303 is input to summing unit 305, where it is added to the output signal of register 307 passing through switch 311. The output of unit 304 is input to register 306. The output of unit 305 is input to register 307.

A sum of results from units 304 and 305 over time are stored in register 306 and 307. In accordance with signal S207, values from registers 306 and 307 are written in buffers 308 and 309. According to signal S207, zero from the output of switch 310 is input to summing unit 304. And according to signal S207, zero from the output of switch 311 is input to summing unit 305. The output of buffer 308 is fed to the input of quantization unit 208. The output of buffer 309 is fed to the input of quantization unit 209. If needed, the output of control accumulation unit 223 can be set to zero, then, the outputs of multipliers 302 and 303 are zero as well.

Returning to FIG. 7B, according to signal S217, the value of registers 306 and 307 are equal to zero. The input signal of control accumulation unit 223 is transmitted to the output of Decimator 205, and the values are stored in registers 306 and 307.

Returning to FIG. 7C, according to signal S217, the value of registers 306 and 307 are equal to zero. Then, control accumulation unit 223 sets values of registers 306 and 307 to zero. Due to this, in registers 306 and 307 there is a value of zero for a certain time. When this setting to a value of zero is over, values again are stored in registers 306 and 307. The process then begins again.

Figure 4A:
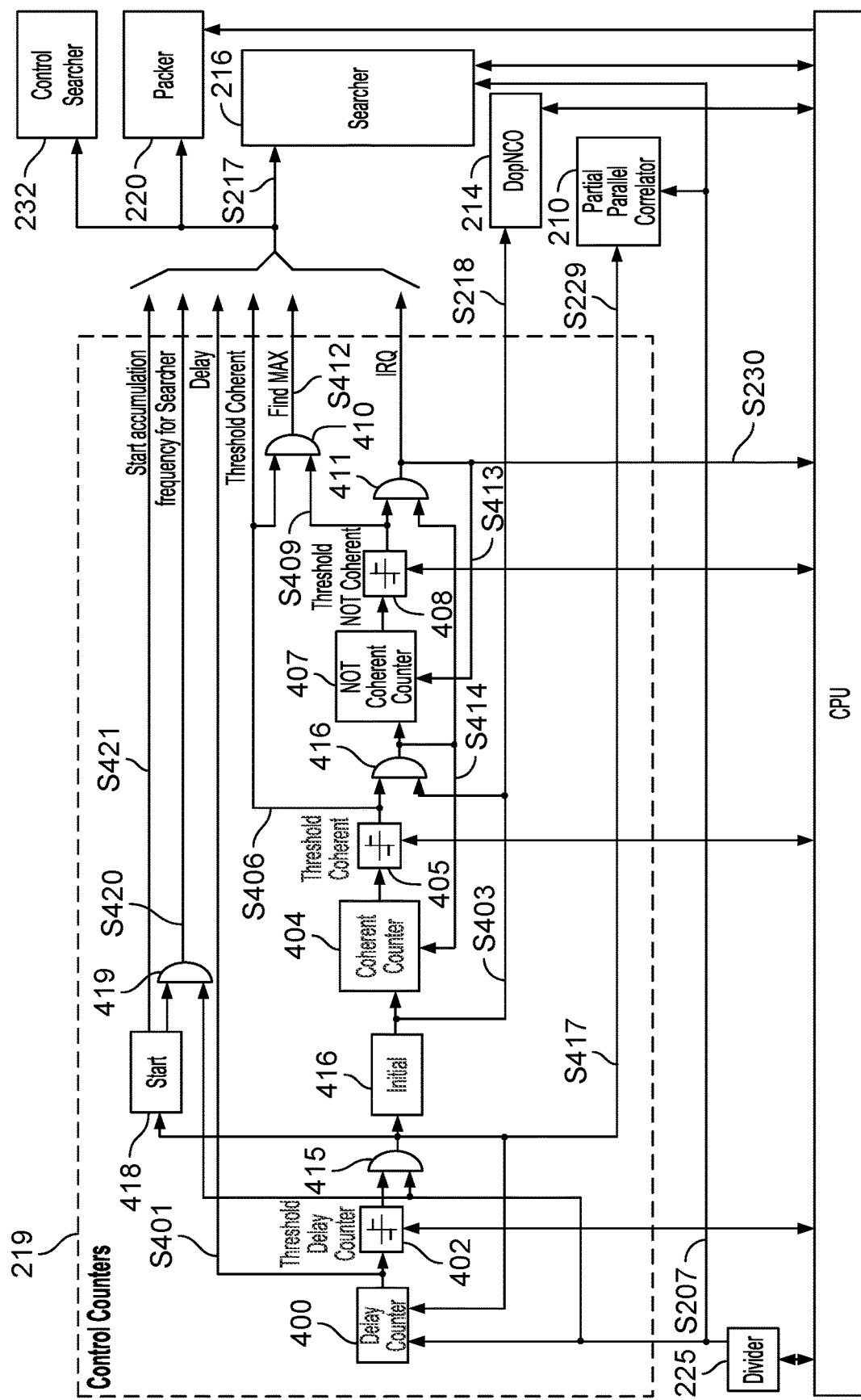
FIG. 4A shows details of the control counters shown in FIG. 2.

FIG. 4A shows details of control counters 219 shown in FIG. 2. Control counters 219, in one embodiment, comprises the following components which interact with various signals including delay counter 400, delay number S401, threshold delay counter 402, coherent counter 404, threshold coherent delay unit 405, coherent counter threshold trigger signal S406, not-coherent counter 407, threshold not-coherent delay 408, not-coherent counter threshold trigger signal S409, AND gate 410, AND gate 411, signal searching for MAX/find MAX signal S412, signal identifying ending the operation of the not-coherent counter S413, signal identifying ending the operation of the coherent counter S414, AND gate 415, signal identifying ending the operation of the delay counter S417, start of operation 418, AND gate 419, frequency signal from searcher S420, and start of accumulation S421.

In the process of initializing FSM 104, CPU 106 starts control counters 219 and assigns threshold delay counter 402, threshold coherent delay unit 405, threshold not-coherent delay unit 408.

After initialization delay counter 400 is set to 0, coherent counter 404 is set to 0, and not-coherent counter 407 is set to 0. Divided fast search frequency signal S207 is input to control counters 219. Signal 207 is also input to delay counter 400, AND gate 415, and AND gate 419.

If S207 is input to delay counter 400, 1 is added to the current value. Output signal of unit 400 is input to threshold delay counter 402. The output of unit 402 is connected to input of AND gate 415. If the value at the input of threshold delay counter 402 is equal to the threshold set by CPU 106, then, if S207 is input to unit 415, the signal of ending the operation of the delay counter S417 is generated. According to signal S417, delay counter 400 takes value 0.

The signal of ending the operation of the delay counter S417 is input to delay counter 400, initial unit 416, start unit 418, and partial parallel correlator 210. Delay number signal S401 is the output of unit 400. Delay number signal S401 is input to searcher 216. The signal of ending the operation of the delay counter S417 is the same as S229.

Initial unit 416 blocks the first pulse of the signal of ending the operation of the delay counter S417, in order to keep zero in units 404 and 407. Such a blocking corresponds to the initial time (see FIGS. 4B/C/D). Signal of ending the operation of the delay counter S417 passed through the initial 416 is delay counter end signal passed through the initial is S403.

Signal S403 is input to coherent counter 404, AND gate 416, and DopNCO unit 214. Delay counter end signal passed through the initial module S403 is the same as S218.

If S403 is input to coherent counter 404, then 1 is added to the current value. The output of unit 404 is input to threshold coherent delay 405. The output of unit 405 is connected to input of AND gate 416. If the value at the input of threshold coherent delay 405 is equal to the threshold set by CPU 106, then, if S403 is available at the input of unit 416, the signal of ending the coherent counter operation S414 is generated. According to signal S414, coherent counter 404 takes value 0.

Signal S414 is input to coherent counter 404, not-coherent counter 407, AND gate 411. Coherent counter threshold trigger signal S406 is output from unit 405. Signal S406 is input to searcher 216 and operation AND unit 410.

If S414 is input to not-coherent counter 407, 1 is added to the current value. The output signal of unit 407 is input to threshold not-coherent delay unit 408. The output of unit 408 is connected to AND gate 411. If the value at the input of threshold not-coherent delay unit 408 is equal to the threshold set by CPU 106, then, if S414 is input to unit 411, the signal of ending the operation of the not-coherent counter S413 is generated. According to S413, unit 407 takes value 0.

Signal S413 is input to not-coherent counter 407, searcher 216 and CPU 106. Note that signal S413 is the same as S230 which is fed to CPU 106. Signal S409 is output from unit 408. Signal S409 is input to AND gate 410 and AND gate 411. Signals S406 and S409 are input to AND gate 410. If S406 and S409 are input unit 410, the signal of searching for MAX S412 is generated.

Signal S417 is input to start unit 418. The output of unit 418 is input to AND gate 419. The output signal of unit 418 is input to AND gate 419 which does not allow S207 to pass through AND 419, until the first pulse of S417 occurs. That is, the signal output from AND gate 419 occurs after delay counter 400 has counted up to the threshold assigned in unit 402, then reset (the full cycle of the delay counter 400 takes place).

Signal S420 is the output signal of unit 419. Signal S421 is fed to the output of start unit 418. After initialization, S421=1. When the first pulse of signal S417 is input to start unit 418, signal S421 is value 1. When the second pulse of signal S417 comes to unit 418, signal S421 is value 0. Signals S421 and S420 are input to searcher 216.

Delay counter 400 counts 0 up to S−1, where S−1 is the maximal number being programmed in the threshold delay counter 402.

Signals from Control Counters S217 include delay number signal S401, coherent counter threshold trigger signal S406, signal searching for MAX S412, signal indicating ending the operation of the not-coherent counter S413; signal identifying frequency of searcher S420; and signal indicating start of accumulation S421.

Figure 4B:
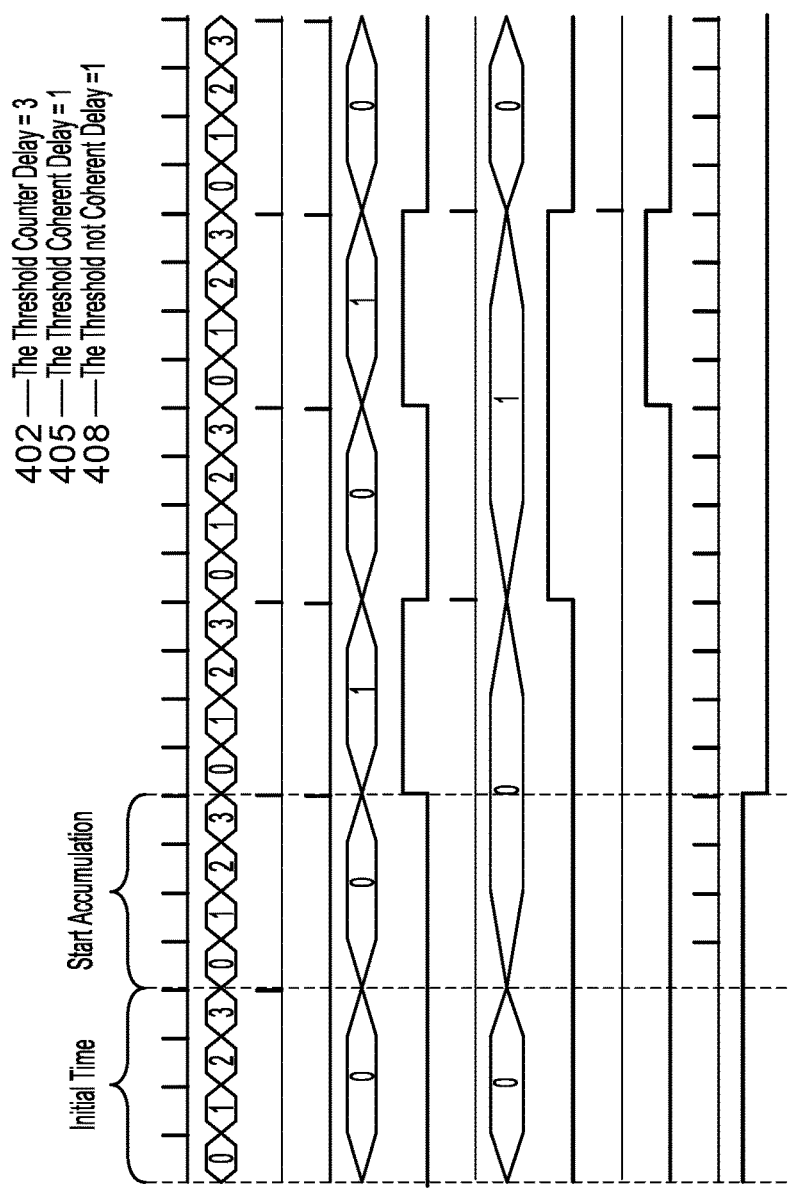
FIG. 4B shows an example of adjustment of the control counters shown in FIG. 4A and FIG. 2.
Figure 4D:
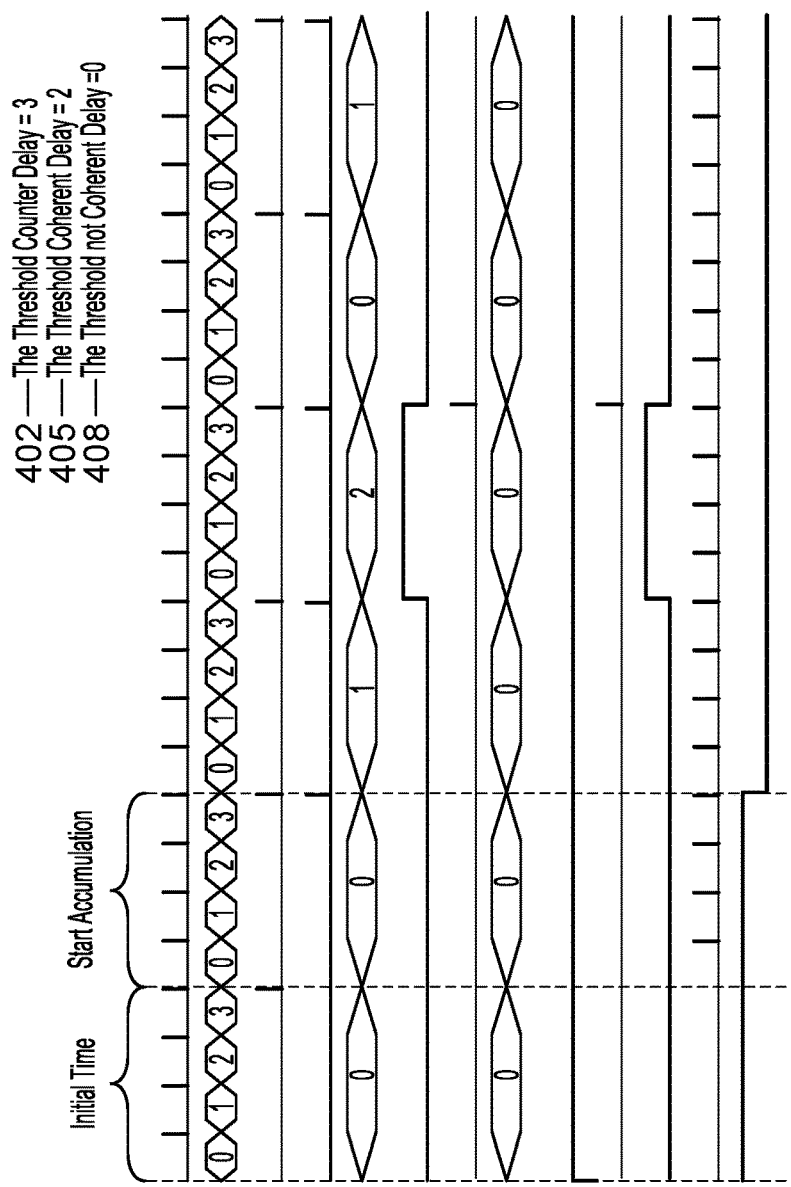
FIG. 4D shows an additional example of adjustment of the control counters shown in FIG. 4A and FIG. 2.
Figure 5:
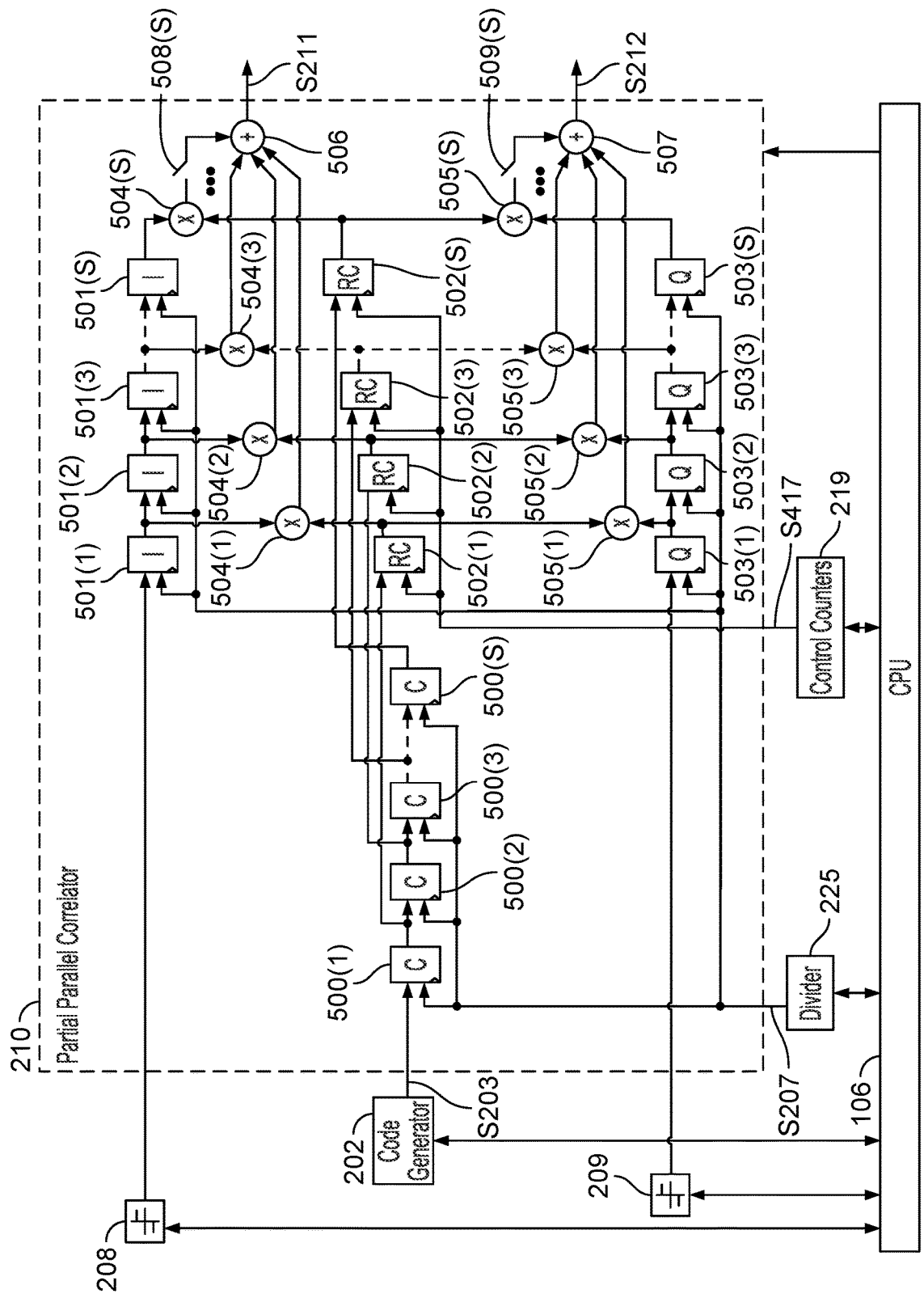
FIG. 5 shows details of the partial parallel correlator shown in FIG. 2.

FIGS. 4B, 4C, and 4D operational diagrams of control counters 219 for the three configuration versions:

FIG. 4B shows Example 1 in which: the threshold delay counter 402=3; the threshold coherent delay 405=1; and the threshold not-coherent delay 408=1;

FIG. 4C shows Example 2 in which: the threshold delay counter 402=3; the threshold coherent delay 405=0; and the threshold not-coherent delay 408=2;

FIG. 4D shows Example 3 in which: the threshold delay counter 402=3; the threshold coherent delay 405=2; and the threshold not-coherent delay 408=0;

FIG. 5 shows details of partial parallel correlator 210 shown in FIG. 2 which comprises code shift register (in scheme C) 500(1), 500(2), 500(3), 500(S), component I shift register (in scheme 1) 501(1), 501(2), 501(3), 501(S), reference code shift register (in scheme RC) 502(1), 502(2), 502(3), 502(S), component Q shift register (in scheme Q) 503(1), 503(2), 503(3), 503(S), multipliers 504(1), 504(2), 504(3), 504(S), multipliers, 505(1), 505(2), 505(3), 505(S), summing units 506, summing units 507, key 508(S), key 509(S)

In one embodiment, initialization of partial parallel correlator 210 is started by keys 508 and 509.

In one embodiment, partial parallel correlator 210 operates as follows. Reference code signal S203 is a bit number having values that can be 1 or 0. Quantizer 208 and 209 output the signs of values fed to the input. A bit number with values 0 and 1 is outputted at the output of units 208 and 209.

Signal S207 is input to partial parallel correlator 210. Code shift registers 500(1), 500(2), 500(3), and 500(S) fix the data if signal S207 is available. Reference code signal S203 is input to code shift register 500(1). Then the output signal from 500(1) is input to shift register 500(2). The output signal from shift register 500(2) is input to shift register 500(3). The output signal from shift register 500(3) is input to shift register 500(S).

Component I shift registers 501(1), 501(2), 501(3), and 501(S) and component Q shift register 503(1), 503(2), 503(3), and 503(S) fix data if S207 is present. The signal output from unit 208 is input to shift register 501(1). Then, the output signal of shift register 501(1) is fed to the input of shift register 501(2). The output signal from the output of shift register 501(2) is fed to the input of shift register 501(3). The output of shift register 501(3) is input to shift register 501(S). The output signal of unit 209 is input to component Q shift register 503(1). Then, the output signal of shift register 503(1) is fed to the input of shift register 503(2). The output signal from the output of shift register 503(2) is fed to the input of shift register 503(3). The output of shift register 503(3) is input to shift register 503(S).

Reference code shift register 502 fixes data if S229 (S417) is present. The output signal of 500(1) is fed to the input of 502(1). The output signal 500(2) is fed to the input of 502(2). The output signal of 500(3) is fed to the input of 502(3). The output signal of 500(S) is fed to the input of 502(S). Values in unit 502 does not change until next S229 (S417) signal is available.

In units 500, 501 and 503, the values are moved according to signal S207. The output signals from 501(1) and 502(1) are input to multiplier 504(1). The output signals from 501(2) and 502(2) are input to multiplier 504(2). Similarly, the output signals from 501(3) and 502(3) are input to multiplier 504(3). The output signals from 501(S) and 502(S) are input to multiplier 504(S). Note that the output signal of unit 504 is a bit. Values of units 501 and 502 are multiplied in unit 504. The output signal from unit 504 is input to unit 506.

Part of higher digits of unit 504 goes through key 508. If needed, part of outputs of unit 504 is not input to unit 506. In one embodiment, whether the outputs of unit 504 are not input to unit 506 depends on the threshold written by CPU 106 in the threshold counter delay 402.

Output signals from 503(1) and 502(1) are input to multiplier 505(1). Output signals from 503(2) and 502(2) are input to multiplier 505(2). Output signals from 503(3) and 502(3) are input to multiplier 505(3). Output signals from 503(S) and 502(S) are input to multiplier 505(S). Output signals from each of 505(1), 505(2), 505(3) and 505(S) are each a bit. Values of units 503 and 502 are multiplied in unit 505. Output signal from unit 505 is fed to unit 507.

Part of higher digits of unit 505 goes through key 509. If needed, part of outputs of unit 505 is not input to unit 507. In one embodiment, whether the outputs of unit 505 are input to unit 507 depends on the threshold written by CPU 106 in the threshold counter delay 402.

The number of units 1 fed from outputs of unit 504 is outputted at the output of unit 506. The number of units 1 fed from outputs of unit 505 is outputted at the output of unit 507. The sum from the output of unit 506 is connected to the number of "units 1" for component I S211. And the sum from the output of unit 507 is connected to the number of "units 1" for component Q S212.

It should be noted that, in one embodiment, code shift register 500 is a shifted array of elements of PRN code. Component I shift register 501 x component Q shift register Q are a shifted array of input samples. Reference code shift register 502 is a non-shifted array of elements PRN code. A convolution of shifted array 501 and non-shifted array 502 is calculated in partial parallel correlator 210 using units 504 and 506, the result of this convolution is signal S211.

A convolution of shifted array 503 and non-shifted array 502 is calculated in partial parallel correlator 210 using units 505 and 507, the result of this convolution is signal S212.

Figure 8:
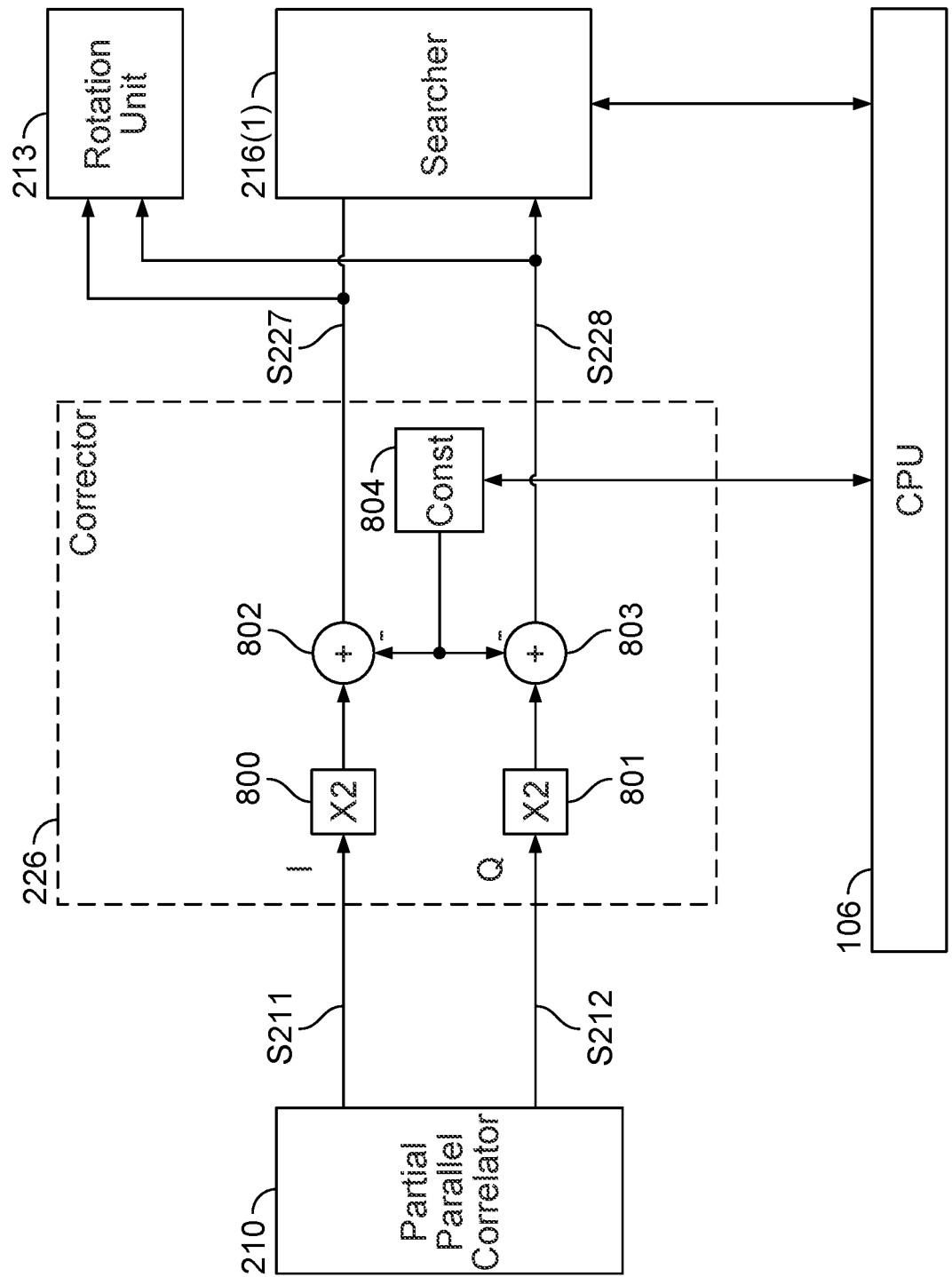
FIG. 8 shows details of the corrector shown in FIG. 2.

FIG. 8 shows details of corrector 226 shown in FIG. 2. Corrector 226 comprises X2 multiplier 800, X2 multiplier 801, summing unit 802, summing unit 803, and constant 804. In one embodiment, initialization of corrector 226 occurs as follows. Before operation, CPU 106 sets a value in unit 804 and the maximal value of a constant in unit 804 is equal to S.

In one embodiment, operation of corrector 226 occurs as follows. Signal S211 is input to X2 multiplier 800 (output of unit 506). In X2 multiplier 800, the incoming number is multiplied by 2. The output signal from X2 multiplier 800 is input to summing unit 802. In summing unit 802, a constant from the output of unit 804 is subtracted from the value from the output of X2 multiplier 800. The output of summing unit 802 is input to Searcher 216(1) and Rotation unit 213. The output of summing unit 802 is signal S227.

Signal S212 is input to X2 multiplier 801 (output of unit 507). In X2 multiplier 801, the input value is multiplied by 2. The output of X2 multiplier 801 is input to constant 803. In constant 803, from the value of the output of unit 801 is subtracted the constant from the output of unit 804. The output of unit 803 is input to searcher 216(1) and Rotation unit 213. The output of unit 803 is S228.

The signal representing the number "1" at the output 506 (S211) is the result of the convolution 501 and 502, from Corrector 226 the mathematically correct convolution number 501 and 502 is sent to the output S227.

The signal representing the number "1" at the output 507 (S212) is the result of the convolution 503 and 502, from corrector 226 the mathematically correct convolution number 503 and 502 comes to the output S228

When initializing FSM 104, the following values are used with the components identified. Threshold counter delay 402 is equal to S−1 or smaller, key 508 and key 509 are on or off, and constant 804 is equal to S or smaller.

The expressions for outputs of Corrector 226 are as follows:

S227=summing units (506)*2−constant (804); and
S228=summing units (507)*2−constant (804).

The following two examples show connections between S227, S228, 402, 508, 509, and 804 and the tables show values of outputs and constants and contain a description of different scenarios.

Example 1

Assume S=1023.
The number of processed delays is S=1023.
The threshold counter delay 402=S−1=1023−1=1022. Counter delay 400 counts from 0 up to 1022.
Constant 804=S=1023.
508(S) and 509(S) are on.

| Output of 506 | Output of 800 multiplied by 2 | Output of 802 | Formula summing units (506) * 2 − constant | Constant | Description |
|---|---|---|---|---|---|
| 1023 | 2046 | 1023 | 1023 * 2 − 1023 | 1023 | All units equal +1 are fed to the input of unit 506 Positive units 1023. Negative units 0 |
| 1 | 2 | −1021 | 1 * 2 − 1023 | 1023 | A unit 1 is fed to the input of unit 506. Value is −1021, as +1 has taken one negative unit from the sum. Positive units: 1. Negative unit 1022. |
| 500 | 1000 | −23 | 500 * 2 − 1023 | 1023 | 500 units are fed to the input of unit 508. The value is −23, as +500 has taken −500 from the sum Positive units: 500 Negative unit 523. |

Example 2

Assume S=1023−2=1021.
Reduce the number of the processed delays by 2.
The threshold counter delay 402=(S−1)−2=(1023−1)−2=1020. Counter delay 400 counts from 0 up to 1020.
Constant 804=S=1021.
508(S) 509(S) 508(S−1) 509(S−1) is disabled. Value 504(S) 504(S−1) not connected to input 508. Value 505(S) 505(S−1) not connected to input 509.

| Output of 506 | Output of 800 multiplied by 2 | Output of 802 | Formula summing units (506) * 2 − constant | Constant | Description |
|---|---|---|---|---|---|
| 1021 | 2042 | 1021 | 1021 * 2 − 1021 | 1021 | All units equal +1 are fed to the input of unit 506 Positive units 1021. Negative units 0 |
| 1 | 2 | −1019 | 1 * 2 − 1021 | 1021 | One unit 1 is fed to the input of unit 506. Value is −1019, |

| Output of 506 | Output of 800 multiplied by 2 | Output of 802 | Formula summing units (506) * 2 − constant | Constant | Description |
|---|---|---|---|---|---|
| | | | | | as +1 has taken one negative unit from the sum. Positive units: 1. Negative unit 1020. |
| 500 | 1000 | −21 | 500 * 2 − 1021 | 1021 | 500 units are fed to the input of unit 508. The value is −21, as +500 has taken −500 from the sum Positive units: 500 Negative unit 521. |

Figure 6:
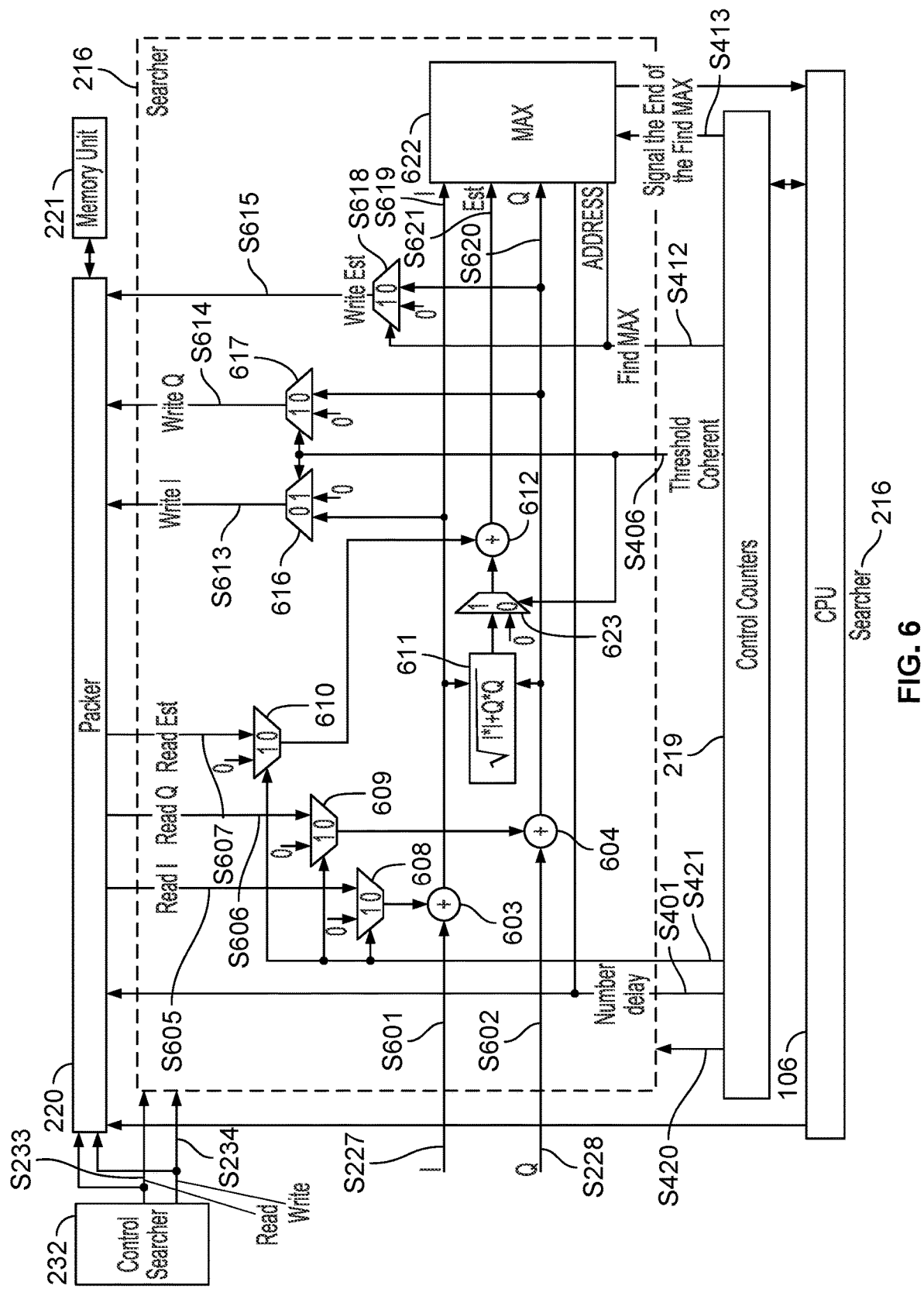
FIG. 6 shows details of the searchers shown in FIG. 2.

FIG. 6 shows details of searchers 216(1), 216(2), and 216(D) as shown in FIG. 2. In one embodiment, searcher 216 comprises components for receiving and outputting various signals including input correlation signal of component I S601, input correlation signal of component Q S602, summing unit of component I 603, summing unit of component Q 604; read signal component I S605, read signal component Q S606, read signal estimation S607, switch 608, switch 609, switch 610, estimation calculation unit 611, summing unit for estimation 612, write signal component I S613, write signal component Q s614, write signal estimation S615, switch 616, switch 617, switch 618, output signal of component I S619, output signal of component Q S620, output signal of estimated S621, MAX 622, and switch 623. Signals S619 and S620 are the coherent metric. Signal S621 is the not-coherent metric.

In one embodiment, operation of searcher 216 is as follows. When Searcher 216 interacts with memory 221, reading/writing data is implemented via packer 220. In searcher 216, all the operations are performed in series for signal S401 which is the address for Memory unit 221: S605 S606 S607 are read from Memory 221; 603, 604 units add input and read-out data for components I, Q; 611 performs estimation of the obtained sums for components I, Q; 612 adds input and read-out estimated data; S613 S614 S615 are written to memory 221 component I, Q and estimation; and 622 selects maximal estimated values.

All operations in searcher 216 are performed according to signal S420. Control searcher 232 implements the control of data processing in searcher 216. Control searcher 232 generates the control of writing/reading data from memory 221. According to signal read from memory S233 there is reading of data from memory 221. According to signal write from memory S234 data are written to Memory 221.

After the above operations, the reset signal S421 is set equal to 1. It remains value 1 during the first and second periods of delay counter 400.

During the first period of operating the delay counter 400 there is no signal S420, within this time period units 500, 501 and 503 are filled according to signal S207, and this time period is the initial time (See FIGS. 4B, 4C, and 4D). According to signal S417 values from component 500 are re-written to component 502. Further, components 500 501 and 503 are filled according to signal S207, the values in component 502 do not change, until signal S417 occurs. The result of convolution for units 501 502 503 passes through corrector 226 and is input to searcher 216 as signals S227 and S228. Signal S601 is the same as S227 and signal S602 is the same as S228.

Each value of signals S601 and S602 corresponds to their delay number S401. And delay counter 400 operates in cycles, and signals S601 and S602 come depending on cyclically-repeated delay number S401. Respectively, input values of signals S601 and S602 can be sequentially processed for each delay.

During the second period of operating delay counter 400 signal S421 is 1. According to signal S420, signals S601 and S602 are sequentially processed. Component I S605, component Q S606, and estimation S607 are read from memory for the current delay S401. Signal S605 is fed to unit 608, signal S606 is fed to unit 609, and signal S607 is fed to 610. Since signal S421 is active, zero is fed to the output of units 608 609 610.

The output signal from unit 608 is input to component 603. The output signal from unit 609 is input to component 604. The output signal from unit 610 is input to component 612.

For the current value S401, signal S601 is input to component 603. For the current value S401, signal S602 is input to component 604. Values of signal S601 and output 608 are added in unit 603. Values of signal S602 and output of unit 609 are added in unit 604. Signal S619 is the output of unit 603. Signal S620 is the output of unit 604.

At S421=1, the data read from the memory are zeroed, and a new coherent or, if needed, not-coherent convolution accumulation is started for units 501, 502 and 503.

Signals S619 and S620 are input to component 611. The following mathematical operation is performed by component 601:

$$\text{Output}611 = \sqrt{(S619*S619 + S620*S620)}$$

The output value from unit 611 is input to component 623. If S406=0, the output of component 623=0 as well. If S406=1, the output signal from component 611 is input to component 623. The output signal from component 623 is input to component 612. Output 610 and output 623 are added in unit 612. Signal S621 is the output of component 612.

At S406=1, there is not-coherent accumulation of convolution results for components 500 501 and 503. Signal S619 goes to input of component 616. Signal S620 goes to input of component 617. If S406 is equal to "1", then outputs 616 and 617 are set to "0". If S406 is equal to 0, then signal S619 is fed to the output of component 616, and S620 is fed to the output of component 617. Signal S613 is the output of component 616. Signal S614 is the output of component 617. Signals S613 and S614 are written to memory 221 via packer 220. If S406=1 then coherent accumulation is zeroed for convolution 501, 502 and (if S406=1 then coherent accumulation is zeroed for convolution 501 502 503). At the next period of delay counter 400, signals S605 and S606=0, i.e., components I and Q are equal to 0, and coherent accumulation of convolution results in units 501, 502, and 503 starts anew.

Signal S621 is input to component 618. If S412=1, then the output value of unit 618=0. If S412=0, then S621 is fed to the output of component 618. Signal S615 is the output of component 618. Signal S615 is written to memory 221 via packer 220.

If S412=1, then not-coherent accumulation is zeroed for convolution 501, 502 and 503 (if S412=1 then not-coherent accumulation is zeroed for convolution 501 502 503). At the next period of delay counter 400, signals S607=0, i.e., estimation unit is equal to 0, and not-coherent accumulation of convolution results in units 501, 502, and 503 starts anew.

Signals S613, S614 and S615 are written to memory 221 for the current value of delay number S401.

For each delay number S401, signal S601 is added to the value from memory S605 and stored in memory as signal S613. Signal S601 is stored during the whole operational period of coherent counter 404.

For each delay number S401, signal S602 is added to the value from memory S606 and stored in memory as signal S614. Signal S602 is stored during the whole operational period of coherent counter 404.

For each delay number S401 at the output of unit 611 values are calculated for signals S619 and S620. For each period of coherent counter 404 a sum of the output value from unit 611 and the value from memory 610, this sum is stored within operation period of not-coherent counter 407.

For each delay number S401 at the end of operation of coherent counter 404, signals S613 and S614 being written to Memory 221 are set to 0 according to S406.

For each delay number S401 at the end of operation of not-coherent counter 407, signal S615 being written to Memory 221 is set to 0 according to S412.

For each delay number S401, if S412 is available at the end of operating not-coherent counter 407, signals S619 S620 S621, results of coherent and not-coherent convolution 501, 502 and 503 are fed to unit MAX 622.

Figure 9:
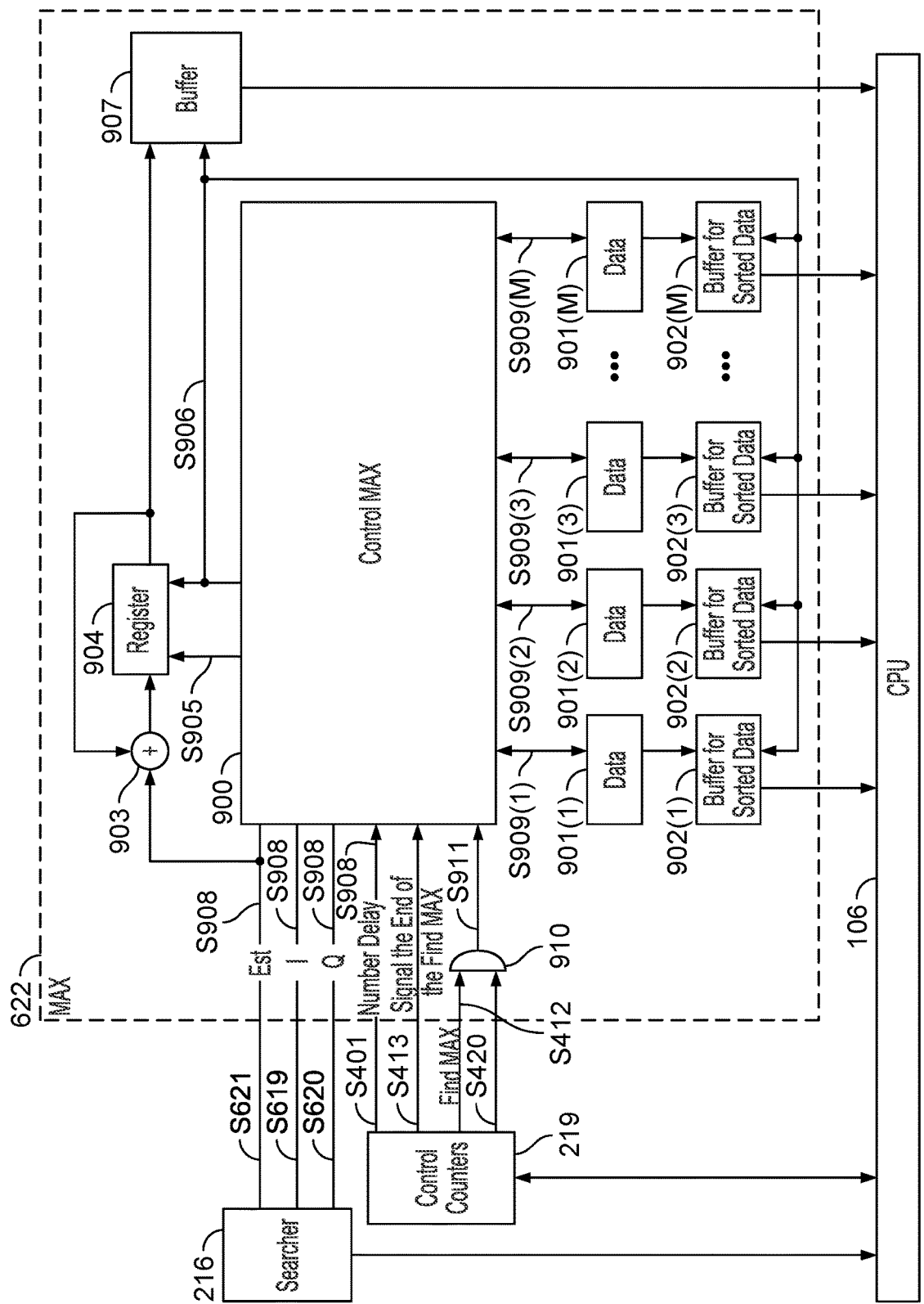
FIG. 9 shows a detail of the MAX shown in FIG. 6.

FIG. 9 shows the details of MAX 622 shown in FIG. 6. The following signals are received by MAX 622: output of the component I S619, output of the component Q S620, output of estimated S621, delay number S401, find MAX S412, signal of ending not-coherent counter operation S413, searcher frequency S420, MAX 622 includes components that transmit and receive various signals including control MAX 900, data 901(1) ... 901(M), buffer for sorted data 902(1) ... 902(M), summing units 903, register 904, signal indicating that searching for MAX/find MAX is occurring S905, signal indicating that searching for MAX has ended S906, buffer 907, signal indicating search result for a single delay, signal of sorting data S909(1), S909(2), S909(3), ... S909(M), AND gate 910, and sorting signal S911.

In one embodiment, MAX 622 operates as follows. MAX 622 is a sorting device to sort input data during period of component 407, the sorted-out data being stored and read by CPU 106 after completing the operation period of component 407. When initializing, 901, 902, 904, and 907 are all set equal to zero.

In one embodiment, the following signals are input to MAX 622: output of the component I S619, output of the component Q S620, output of the Estimation unit S621, delay number S401, signal indicating find MAX S412, signal indicating ending of operation of the not-coherent counter S413, signal identifying searcher frequency S420.

Signals S412 and S420 are input to component 910. If S412 and S420 are equal to 1 (signal is available), then the output of unit 910=1 (signal is available). The output of unit 910 is the same as signal S911. Signal S911 is input to control MAX 900.

Signals S619, S620, and S621, which were obtained within not-coherent counter 407 operation, come together with each delay number S401 in MAX 622. A search result for a single delay S908 includes signals: S401, S619, S620 and S621.

The following signals are input to control MAX 900: output of the component I S619, output of the component Q S620, output of the estimated signal S621, delay number S401, signal of sort S911, and signal indicating ending the operation of the not-coherent counter S413.

When S911 is input to control MAX 900, signal S908 is sorted for each signal S401. Sorting S908 is implemented using signal S621. Sorting lasts the whole period of operating not-coherent counter 407. Signal S909 is the sorted-out values S908. Signals S909 from unit 900 are input to unit 901(1), 901(2), 901(3), ..., 901(M) and stored there. The number of sorted values is M. When sorting S908 is over, value in unit 901 is updated if needed.

When signal S413 confirming the end of operating not-coherent counter 407 is detected, control MAX 900 waits for sorting end signal S908 for the last value of S401. When sorting is completed, signal S906 is output. Sorted values S909 are written to data 901(1), 901(2), 901(3) ... 901(M).

Signal S906 from control MAX 900 is input to the following components: buffer for sorted data 902(1), 902(2), 902(3), ..., 902(M), register 904, and buffer 907. When sorting is completed, the value from unit 901 is written to buffer 902(1), 902(2), 902(3), ... 902(M) according to signal S906. According to signal S906, values in units 901 are set to 0.

Sorting continues for the next operation period of not-coherent counter 407. Data 902 is stored until next S906 signal is received. CPU 106 reads values from 902(1), 902(2), 902(3), ... 902(M).

Signal S905 at the output of unit 900 is the same as signal S911.

Signal S621 is input to adder 903. The output of register 904 is input to summing units 903 and Buffer 907. Signal S621 and the output signal of unit 904 are added in unit 903. The output of unit 903 is fed to the input of unit 904. A sum of S621 values for each delay number S401 is stored in unit 904 during operation period of not-coherent counter 407 if S905 (S911) is available.

According to signal S906, the stored sum S621 from register 904 is written to unit 907, and values in the register 904 are set to 0. When the next operation period of not-coherent counter 407 starts, and first signal S911 arises, the input value of unit 904 is set to 0. A sum of not-coherent values for each signal S401 is stored in register 904 during operation of signal S412=1 if signal S420 is available. The value from Buffer 907 is read by CPU 106.

Figure 10:
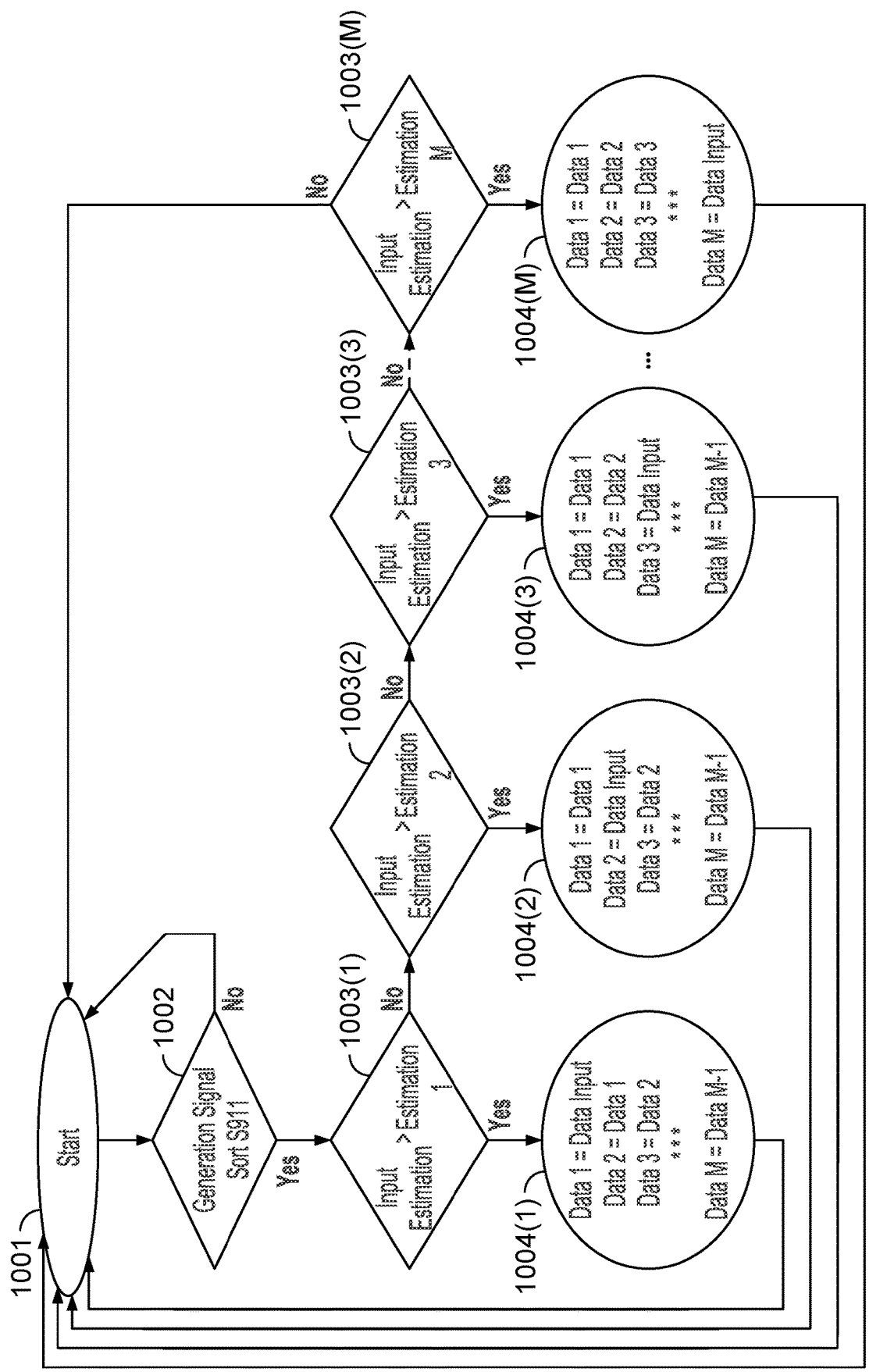
FIG. 10 shows a flow chart of operation of sorting unit shown in FIG. 9.

FIG. 10 shows a flow chart of a method for sorting search results for a single delay in control MAX 900 where the method begins at start operation 1001. A sorting signal is generated at generation signal sort 1002, and conditions 1003(1), 1003(2), 1003(3), ... 1003(M) are checked and operations 1004(1), 1004(2), 1004(3), ... 1004(M) are performed based on the conditions.

In one embodiment, the operation of sorting unit in control MAX 900 is in accordance with the method of FIG. 10 as follows.

Data sorting in control MAX 900 starts if signal S911 is detected. Data sorting is performed based on the output signal of the estimation unit S621. Signal S621 is the input estimate. A search result for a single delay S908 includes signals: S401, S619, S620 and S621. Estimate 1 is signal S621 from Data 901(1). Estimate 2 is S621 from Data 901(2), and Estimate 3 is S621 from Data 901(3). So, Estimate M is signal S621 from Data 901(M).

During initialization unit 901 is set to 0. Once FSM 104 has been initialized, the signal is input to begin at start 1001. From step 1001 the flow chart goes to step 1002. At step 1002, the method analyzes signal S911. If S911=0, the flow chart loops to step 1001 and then it comes back to unit 1002. If S911=1, the flow chart proceeds to 1003(1).

At step 1003(1), condition "input estimate is greater than estimate 1" is analyzed. If this condition is not satisfied, then the method proceeds to step 1003(2). If condition in step 1003(1) is satisfied, the following operations are carried out: Data 901(M−1) is written to Data 901(M); Data 901(2) is written to Data 901(3); Data 901(1) is written to Data 901(2); S908 is written to Data 901(1); and then the method returns to start 1001.

At step 1003(2) condition "Input estimate is greater than estimate 2" is analyzed. If condition 1003(2) is not satisfied, the method proceeds to step 1003(3). If it is satisfied, the following operations are carried out: Data 901(M−1) is written to Data 901(M); Data 901(2) is written to Data 901(3); S908 is written to Data 901(2); Data 901(1) does not change; and then the method returns to start 1001.

At step 1003(3) condition "Input estimate is greater than estimate 3" is analyzed. If condition 1003(3) is not satisfied, the method proceeds to step 1003(4). If it is satisfied, the following operations are carried out: Data 901(M−1) is written to Data 901(M); S908 is written to Data 901(3); Data 901(2) does not change; Data 901(1) does not change; and then the method returns to start 1001.

At step 1003(M) condition "Input estimate is greater than estimate M" is analyzed. If condition 1003(M) is not satisfied, the method proceeds to start 1001. If it is satisfied, the following operations are carried out: S908 is written to Data 901(M); Data 901(3) does not change; Data 901(2) does not change; Data 901(1) does not change; and then the method returns to start 1001.

Figure 11:
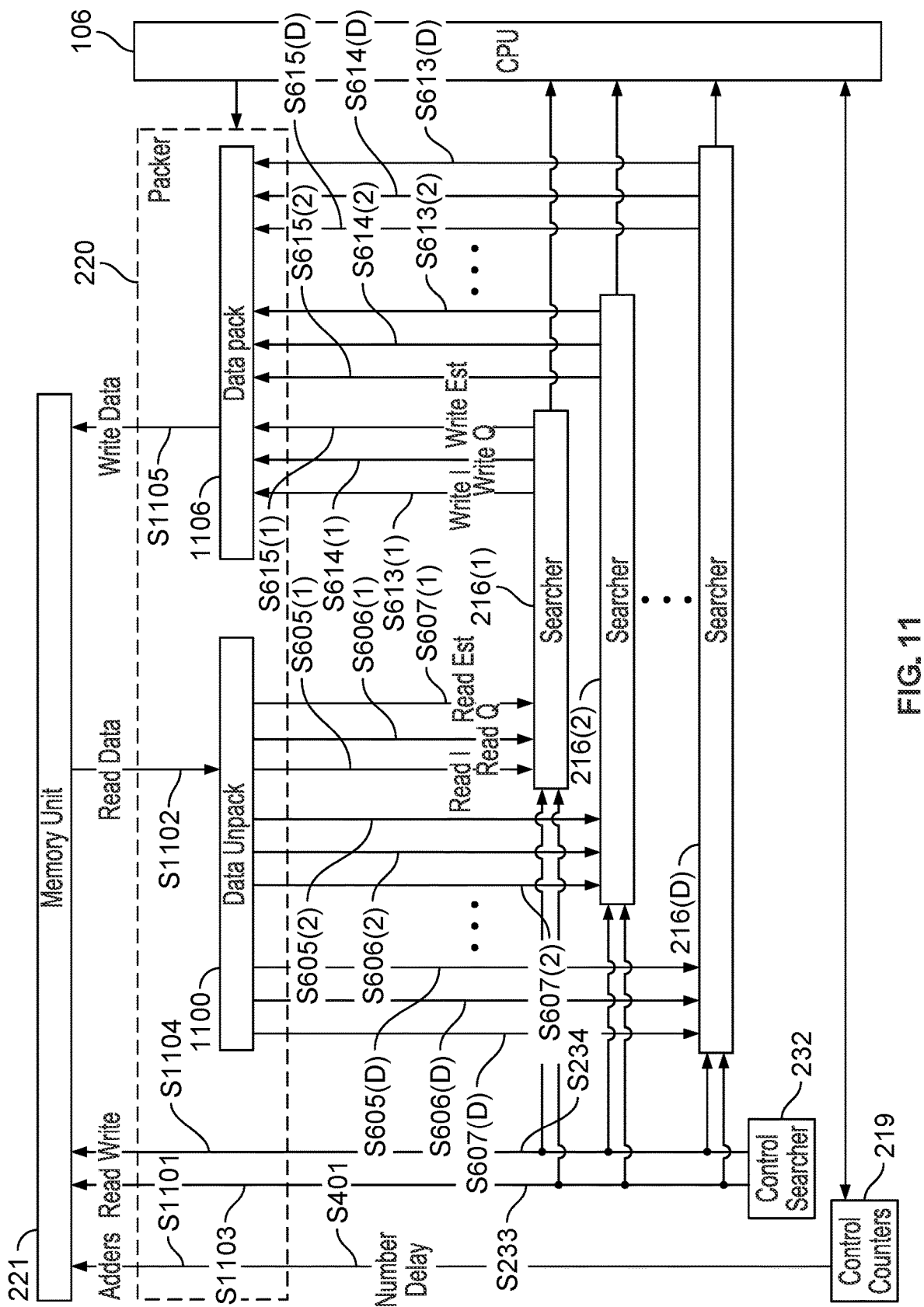
FIG. 11 shows details of the packer shown in FIG. 2.

FIG. 11 shows details of packer 220 shown in FIG. 2. Packer 220, in one embodiment, includes components that transmit and receive various signals including data unpacker 1100, address S1101, read data S1102, read S1103, write S1104, write data S1105, and pack data 1106.

In one embodiment, packer 220 operates as described as follows in conjunction with FIGS. 11 and 2. In the process of signal searching in conjunction with DopNCO 214, rotation units 213(2) . . . 213(D) and searchers 216(1), 216(2), . . . 216(D) obtained results are written and read to/from memory 221 via packer 220. Using signal S401 as address S1101, signals S613, S614 and S615 pass through data packer 1106 and are written to memory 221 in one word. Write data S1105 comprises data that is written to memory unit 221 in a similar manner.

Using signal S401 as address S1101, data is read from memory 221 (or similarly read signal read data S1102) as one word. Signal S1102 passing through data unpacker 1100 is unpacked to generate signals S605, S606 and S607 which are then transmitted to searcher 216.

The results of operation of searcher 216 are signals S613, S614 and S615 which are written to memory 221 at address S1101. The bit number in signals S613, S614 and S615 can exceed bit number in the word write data S1105. As a result, signals S613, S614 and S615 can be packed in a different way.

For example, at the input of packer 220 there are integers, but in packer 220 they are transformed into floating format, where the floating number is mantissa and exponent, all the numbers having a common exponent. The mantissa is kept/different for each number, but the exponent is common. The exponent is chosen such that all high-order digits would lie within the mantissa.

Signals S615(1), S615(2), . . . S615(D) from outputs of searchers 216(1), 216(2), . . . 216(D) are combined by the common exponent. Signals S613 and S614 from outputs of searcher 216(1), 216(2), . . . 216(D) are also combined by the common exponent. The mantissa and exponents of signals S615, S613 and S614 obtained at data packing are fed to the output of data packer 1106. In data pack 1100 data, read from the memory, are unpacked considering mantises, exponents and operation mode of packer 220.

In one embodiment, packer 220 is initialized when CPU 106 starts operation of packer 220. In one embodiment, packer 220 operates as follows.

S401 is input to packer 220. Signal S1101 is the same as signal S401. Signal S1101 is input to memory unit 221 as an address. Signal S1102 is input to data unpack 1100 of data read from memory 221. In memory unit 221, S1105 is input as written data from unit 1106.

Signal S233(1) is input to packer 220. Signal read S1103 is the same as signal S233. S1103 is input to memory unit 221 as a read. If signal S233 is detected, data are read from memory unit 221 at address identified by signal S1101, and signal S1102 goes to the input of unit 1100, where they are unpacked. From data unpack 1100 these signals are input to: searcher 216(1) which receives signals S605(1), S606(1) and S607(1); searcher 216(2) which receives signals S605(2), S606(2) and S607(2); and searcher 216(D) which receives signals S605(D), S606(D) and S607(D).

Signal S234(1) is input to packer 220. Signal write S1104 is the same as signal S234. S1104 is input to memory 221 as a write.

In data pack 1106, signals input are packed as follows: signals S613(1), S614(1) and S615(1) are output from searcher 216(1); signals S613(2), S614(2) and S615(2) are output from searcher 216(2); and signals S613(D), S614(D) and S615(D) are output from searcher 216(D).

If signal S234 is available, data packed in 1106 are written (write data S1105) to Memory 221 at address S1101 write data S1105.

There are different packing and unpacking modes for storing temporary data in unit 221 depending on searcher 216 modes and the number of Doppler NCO. Here are Some Examples:

1) Condition: Unit 405=0, Unit 408=0.
   Result: In this case there no need to keep data from signals S613 S614 S615 in memory 221.
2) Condition: Unit 405 is greater than 0, Unit 408=0.
   Result: In this case there is no need to keep data from signal S615 in memory 221. In memory 221 there are kept only data from signals S613 and S614.
3) Condition: The capacity of signal S613 and signal S614 has a greater priority than capacity of signal S615.
   Result: To pack data from signal S613 and signal S614, a lower-digit exponent and higher-digit mantissa are used. For signal S615, a higher-digit exponent and lower-digit mantissa are kept.
4) Condition: The capacity of signal S615 has a greater priority than capacity of signal S613 and signal S614.
   Result: To pack data from signal S615, a lower-digit exponent and higher-digit mantissa are used. For signal S613 and signal S614, a higher-digit exponent and lower-digit mantissa are kept.
5) Condition: In memory 221 there is enough space for values of signals S615, S613 and S614.
   Result: Signals S615, S613 and S614 are written to memory 221.

Figure 12:
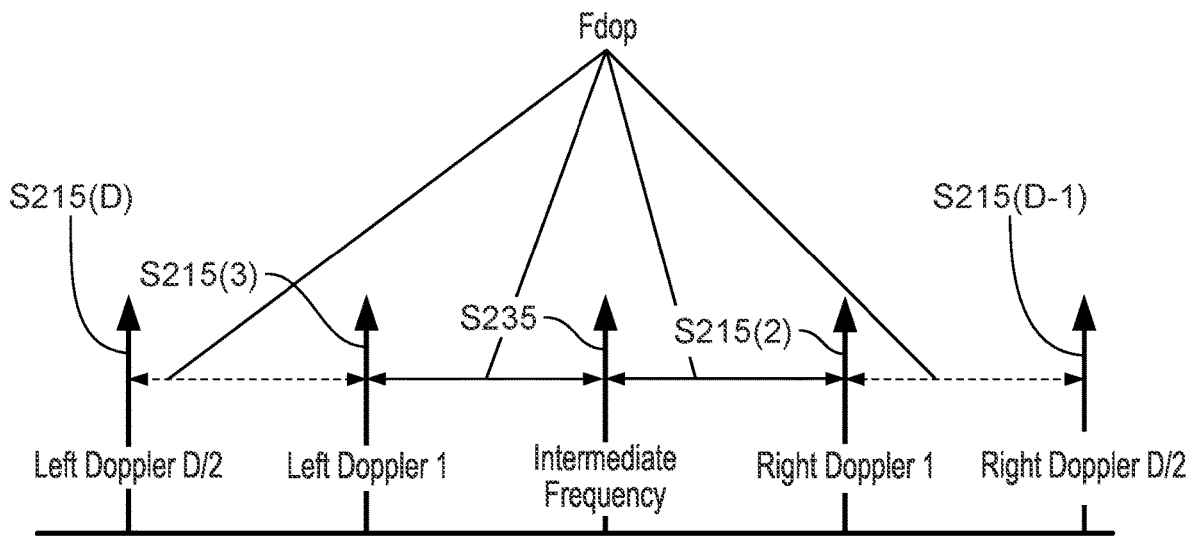
FIG. 12 shows signals generated by Doppler NCO shown in FIG. 2.

FIG. 12 shows details of Doppler NCO 214 shown in FIG. 2. Doppler NCO 214 generates rotation signal S215(D), . . . S215(3), S235, S215(2) . . . S215(D−1) Each rotation signal S215 is used to generate Left Doppler or Right Doppler frequency.

Intermediate Frequency S235 serves as Center Doppler frequency. Right Doppler frequency 1 generates S215(2), Left Doppler frequency 1 is generated mirror-like using signal S215(3). Right Doppler frequency D/2 generates signal S215(D−1) and Left Doppler frequency D/2 is generated mirror-like using S215 (D−1).

In FSM 104 Doppler Frequency is generated with a step of Fdop, these frequencies include: Center Doppler; Left Doppler 1; Right Doppler 1; Left Doppler D/2; and Right Doppler D/2.

Left Doppler frequency (D/2 . . . 1) and Right Doppler frequency (D/2 . . . 1) change in phase available by S218 (equal to S403) considering S length of shift registers 500, 501, 502, 503 and unit 402 set by CPU 106. The expression for calculation of Fdop is as follows.

$$F\text{dop}=(F_{IF}/S)*d[N-1:0]/2^N$$

where: $F_{IF}$ is Intermediate Frequency S235; S is the length of shift registers 500, 501, 502, 503 (delay counter 400 counts from 0 up to S−1); and N is the bit number of Doppler NCO phase; d[N−1:0] the number written to the Doppler NCO 214.

Signal S215 from the output of Doppler NCO 214 is input to rotation unit 213. Signals of component I S227 and signal of component Q S228 are input to rotation unit 213. In each rotation unit 213 signals S227 and S228 are rotated in phase in an angle set by S215. Its own rotation signal S215 (D . . . 2) is generated for Left Doppler (D/2 . . . 1) and Right Doppler (D/2 . . . 1), S227 and S228 rotate phase in a different way.

In unit 213(D) signals S227 and S228 are rotated in phase at frequency Left Doppler D/2 (S215(D) is used) and are fed to the input of Searcher 216(D).

In unit 213 (D−1), signals S227 and S228 are rotated in phase at frequency Right Doppler D/2 (S215(D−1) is used) and are fed to the input of Searcher 216 (D−1).

In unit 213(3), signals S227 and S228 are rotated in phase at frequency Left Doppler 1 (S215(3) is used) and are fed to the input of Searcher 216(3).

In unit 213(2), signals S227 and S228 are rotated in phase at frequency Right Doppler 1 (S215(2) is used) and are fed to the input of Searcher 216(2).

Signals S227 and S228 are fed to the input of Searcher 216(1) at Intermediate Frequency S235.

The operation of shift registers 500, 501, 502, and 503 and reload generator 224 will now be explained using an example including several tables showing values at different points in time. Assume, S=4, code length=12, generated frequency CRNCO 201 is equal to frequency of FSNCO 206. The state of code generator 202 is memorized as 5$^{th}$ chip of FSNCO 206 and uploaded in 13$^{th}$ chip of FSNCO 206. Table rows 500, 501/503, and 502 show chip numbers for code chips generated by code generator 202 during initialization and during the steps performed to detect a signal.

Initialization of 500 501 503

| | Chip number generated by FSNCO 206 and CRNCO 201 | | | | | | | | | | | | | |
|---|---|---|---|---|---|---|---|---|---|---|---|---|---|---|
| Description | 1 | | | 2 | | | 3 | | | 4 | | | | |
| 500 | — | — | — | 1 | — | — | 1 | 2 | — | 1 | 2 | 3 | 1 | 2 | 3 | 4 |
| 501/503 | — | — | — | 3 | — | — | 3 | 4 | — | 3 | 4 | 5 | 3 | 4 | 5 | 6 |
| 502 | — | — | — | — | — | — | — | — | — | — | — | — | — | — | — | — |
| event | | | — | | | — | | | — | | | — | | | — | |

Step 1 searching for code for chip numbers of Reference Code 1 2 3 4

| | Chip number generated by FSNCO 206 and CRNCO 201 | | | | | | | | | | | | | | | |
|---|---|---|---|---|---|---|---|---|---|---|---|---|---|---|---|---|
| Description | 5 | | | | 6 | | | | 7 | | | | 8 | | | |
| 500 | 2 | 3 | 4 | 5* | 3 | 4 | 5 | 6 | 4 | 5 | 6 | 7 | 5 | 6 | 7 | 8 |
| 501/503 | 4 | 5 | 6 | 7 | 5 | 6 | 7 | 8 | 6 | 7 | 8 | 9 | 7 | 8 | 9 | 10 |
| 502 | 1 | 2 | 3 | 4 | 1 | 2 | 3 | 4 | 1 | 2 | 3 | 4 | 1 | 2 | 3 | 4 |
| event | *state of unit 202 is memorized | | | | — | | | | — | | | | — | | | |

Step 2 Storing of Reference Code 1 2 3 4 + 5 6 7 8

| | Chip number generated by FSNCO 206 and CRNCO 201 | | | | | | | | | | | | | | | |
|---|---|---|---|---|---|---|---|---|---|---|---|---|---|---|---|---|
| Description | 9 | | | | 10 | | | | 11 | | | | 12 | | | |
| 500 | 6 | 7 | 8 | 9 | 7 | 8 | 9 | 10 | 8 | 9 | 10 | 11 | 9 | 10 | 11 | 12 |
| 501/503 | 8 | 9 | 10 | 11 | 9 | 10 | 11 | 12 | 10 | 11 | 12 | 1 | 11 | 12 | 1 | 2 |
| 502 | 5 | 6 | 7 | 8 | 5 | 6 | 7 | 8 | 5 | 6 | 7 | 8 | 5 | 6 | 7 | 8 |
| event | | | — | | | | — | | | | — | | | | — | |

| Step 3 Storing of Reference Code 1 2 3 4 + 5 6 7 8 + 9 10 11 12 | | | | |
|---|---|---|---|---|
| | Chip number generated by FSNCO 206 and CRNCO 201 | | | |
| Description | 13 | 14 | 15 | 16 |
| 500 | 10 11 12 5* | 11 12 5 6 | 11 5 6 7 | 5 6 7 8 |
| 501/503 | 12 1 2 3 | 1 2 3 4 | 2 3 4 5 | 3 4 5 6 |
| 502 | 9 10 11 12 | 9 10 11 12 | 9 10 11 12 | 9 10 11 12 |
| event | *upload the state in 202 | — | — | — |

| Step 4 Searching for the chip numbers of Reference Code 5 6 7 8 | | | | |
|---|---|---|---|---|
| | Chip number generated by FSNCO 206 and CRNCO 201 | | | |
| Description | 17 | 18 | 19 | 20 |
| 500 | 6 7 8 9** | 7 8 9 10 | 8 9 10 11 | 9 10 11 12 |
| 501/503 | 4 5 6 7 | 5 6 7 8 | 6 7 8 9 | 7 8 9 10 |
| 502 | 5 6 7 8 | 5 6 7 8 | 5 6 7 8 | 5 6 7 8 |
| event | **the state of 202 is memorized | 502 matches 501/503 | — | — |

| Step 5 Storing of Reference Code 5 6 7 8 + 9 10 11 12 | | | | |
|---|---|---|---|---|
| | Chip number generated by FSNCO 206 and CRNCO 201 | | | |
| Description | 21 | 22 | 23 | 24 |
| 500 | 10 11 12 1 | 11 12 1 2 | 12 1 2 3 | 1 2 3 4 |
| 501/503 | 8 9 10 11 | 9 10 11 12 | 10 11 12 1 | 11 12 1 2 |
| 502 | 9 10 11 12 | 9 10 11 12 | 9 10 11 12 | 9 10 11 12 |
| event | — | 502 matches 501/503 | — | — |

| Step 6 Storing of Reference Code 5 6 7 8 + 9 10 11 12 + 1 2 3 4 | | | | |
|---|---|---|---|---|
| | Chip number generated by FSNCO 206 and CRNCO 201 | | | |
| Description | 25 | 26 | 27 | 28 |
| 500 | 2 3 4 9** | 3 4 9 10 | 4 9 10 11 | 9 10 11 12 |
| 501/503 | 12 1 2 3 | 1 2 3 4 | 2 3 4 5 | 3 4 5 6 |
| 502 | 1 2 3 4 | 1 2 3 4 | 1 2 3 4 | 1 2 3 4 |
| event | **upload the state in 202 | 502 matches 501/503 | — | — |

| Step 7 Searching for code of chip numbers of Reference Code 9 10 11 12 | | | | |
|---|---|---|---|---|
| | Chip number generated by FSNCO 206 and CRNCO 201 | | | |
| Description | 29 | 30 | 31 | 32 |
| 500 | 10 11 12 1*** | 11 12 1 2 | 12 1 2 3 | 1 2 3 4 |
| 501/503 | 4 5 6 7 | 5 6 7 8 | 6 7 8 9 | 7 8 9 10 |
| 502 | 9 10 11 12 | 9 10 11 12 | 9 10 11 12 | 9 10 11 12 |
| event | ***the state of unit 202 is memorized | — | — | — |

| Step 8 Storing of Reference Code 9 10 11 12 + 1 2 3 4 | | | | | | | | | | | | | | | | |
|---|---|---|---|---|---|---|---|---|---|---|---|---|---|---|---|---|
| | Chip number generated by FSNCO 206 and CRNCO 201 | | | | | | | | | | | | | | | |
| Description | 33 | | | | 34 | | | | 35 | | | | 36 | | | |
| 500 | 2 | 3 | 4 | 5 | 3 | 4 | 5 | 6 | 4 | 5 | 6 | 7 | 5 | 6 | 7 | 8 |
| 501/503 | 8 | 9 | 10 | 11 | 9 | 10 | 11 | 12 | 10 | 11 | 12 | 1 | 11 | 12 | 1 | 2 |
| 502 | 1 | 2 | 3 | 4 | 1 | 2 | 3 | 4 | 1 | 2 | 3 | 4 | 1 | 2 | 3 | 4 |
| event | | | | | — | | | | — | | | | — | | | — |

| Step 9 Storing of Reference Code 9 10 11 12 + 1 2 3 4 + 4 5 6 7 | | | | | | | | | | | | | | | | |
|---|---|---|---|---|---|---|---|---|---|---|---|---|---|---|---|---|
| | Chip number generated by FSNCO 206 and CRNCO 201 | | | | | | | | | | | | | | | |
| Description | 37 | | | | 38 | | | | 39 | | | | 40 | | | |
| 500 | 6 | 7 | 8 | 1*** | 7 | 8 | 1 | 2 | 8 | 1 | 2 | 3 | 1 | 2 | 3 | 4 |
| 501/503 | 12 | 1 | 2 | 3 | 1 | 2 | 3 | 4 | 2 | 3 | 4 | 5 | 3 | 4 | 5 | 6 |
| 502 | 5 | 6 | 7 | 8 | 5 | 6 | 7 | 8 | 5 | 6 | 7 | 8 | 5 | 6 | 7 | 8 |
| event | ***the state is uploaded in 202 | | | | — | | | | — | | | | — | | | |

The table for step 9 shows that the signal was detected (steps 4-6), the sum of convolution results for registers 501 502 503 for numbers 18 22 26 of the generated chip FSNCO 206 and CRNCO 201. Reference Code for the 5th code chip generated by code generator 202 matched.

The capabilities of FSM 104 shown in FIG. 2 include the following. In operation with FSM 104, it is possible to get a sliding window/searching window S that determines the number of viewed code delays at the same time.

To increase sensitivity of searching or in the case of code length greater than S, it is necessary to increase search time in k times. Search time can be increased thanks to coherent accumulation. An increase in accumulation time can be also possible when information symbols imposed/overlapped on code by not-coherent accumulation are available.

If code length is greater than S, reload generator 234 can be also used and, after starting operation of FSM 104 the sliding window/search window S is moved along the whole code length, and metrics can be obtained for all delays.

With Fast Search NCO 206, different numbers of delays can be set for one CODE chip. For example, two semi-chips are used for one GPS CA chip, and frequency Fast Search NCO 206 is twice as much as CRNCO 201.

Multiplexed code is used at least as two chip by chip codes. Using fast search NCO 206, control accumulation unit 223 and divider 225, one code can be sent into searching mechanism, and the other code set to zero in the input signal. Doppler NCO 214 and Rotation unit 213 allow obtaining results for a plurality of Doppler frequencies for the searching window S.

Different operational modes of Packer 220 make it possible to select a preferable value: component I or component Q, or estimate during data packing/unpacking. At the end of searching period S*k, when metrics are sorted, estimates of all S are added.

Using FSM 104 it is possible to receive CSK-modulated signals. For example, in the process of receiving GPS CA signal using semi-chips CODE the frequency of unit Fast Search NCO 206 is twice as much as frequency CRNCO 201, data are coherently accumulated within 2 milliseconds and S=1023, threshold not-coherent 408 set 0. In this case, the convolution results of all registers 501, 502, and 503 are coherently stored during 4 periods of operating delay counter 400 for each S, at the 4th period unit MAX 622 sorts metrics.

It should be noted that reload generator 224 remembers the state of code generator 202 at the 1023+1-th chip of fast search NCO 206 and records the memorized state of unit 202 so that code generator can start at once from this state in/to the 1023*4+1-th chip of fast search NCO 206. Setting data make it possible to view 2046 GPS CA semi-chip CODE without re-adjusting FSM 104.

Figure 13:
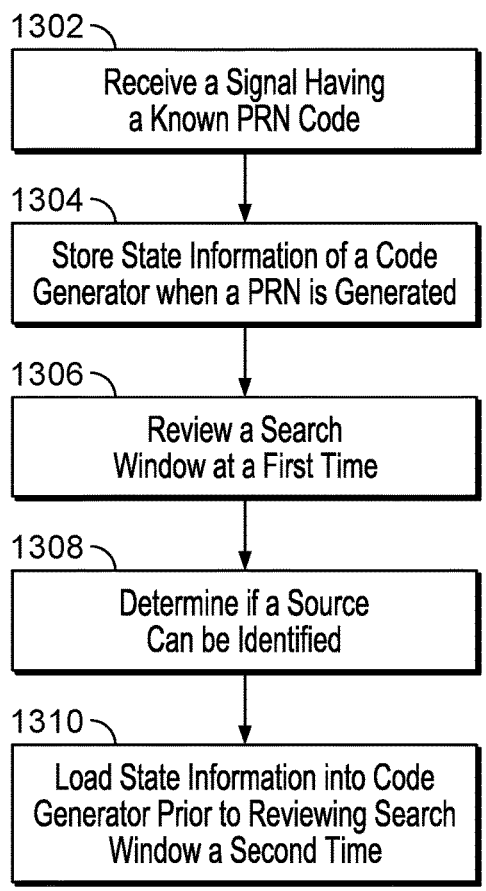
FIG. 13 is a flowchart showing a method for operation of the navigation receiver shown in FIG. 1.

FIG. 13 depicts a flow chart of method 1300 for fast searching global navigation satellite system signals according to an embodiment. In one embodiment, method 1300 is performed using navigation receiver 110 shown in FIG. 1. At step 1302, a signal is received at the receiver. The signal has a known pseudo random noise code. At step 1304, state information of a code generator is stored when a pseudo random noise is generated by the code generator. The state information, in one embodiment, is the information pertaining to the code generator that is required to be input into the code generator in order to generate the same pseudo random noise previously generated. In one embodiment, the pseudo random noise generated by the code generator is associated with the pseudo random noise code of the signal. At step 1306, a search window associated with the received signal is reviewed a first time. The search window, in one embodiment, comprises a string of data obtained from the received signal. As described above, the reviewing is to attempt to identify a source of the received signal (i.e., the satellite that transmitted the received signal). At step 1308, it is determined if a source of the received signal can be identified. After a source is identified, the information can be used to determine the position of the receiver. At step 1310, the state information previously stored in step 1304 is loaded into the code generator prior to reviewing the search window a second time in response to the determining. The loading of the state information into the code generator allows sequential review of the search window without re-adjustment of FSM 104. In one embodiment, the received signal is processed by a control accumulator using a plurality of multiplexed signals on a fast search numerically controlled oscillator frequency. One of the plurality of multiplexed signals can be zeroed. Zeroing one of the signals causes the zeroed signal to be ignored in the analysis of the plurality of signals. In one embodiment, the received signal is multiplied by an intermediate frequency prior to the determining in step 1308. In one embodiment, a rotation angle is added to the received signal. The rotation angle can be based on a Doppler numerically controlled oscillator. The results generated while reviewing the search window can be stored in a coherent mode or a not-coherent mode. The not-coherent mode allows searching for signals with superimposed data.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. An apparatus for fast searching radio navigational signals having known pseudo-random noise (PRN) code, the apparatus comprising:
an antenna configured to receive radio signals having a known PRN code;
a radio frequency (RF) path configured to receive the radio signals from the antenna and move the radio signals to an intermediate frequency signal;
a numerically controlled oscillator configured to output pulses at a period of PRN elements;
an analog to digital converter (ADC) configured to sample the intermediate frequency signal;
a digital mixer configured to receive signals from the ADC and output a sampled signal at a zero frequency;
a decimator configured to receive the sampled signal at the zero frequency from the digital mixer;
a correlator configured to calculate a convolution of shifted array of inputs received from the decimator via a pair of quantization units with non-shifted array of PRN code elements;
a memory unit configured to store a result of a value output from the correlator;
a code generator configured to calculate a new element upon pulses output from the numerically controlled oscillator;
an intermediate frequency numerically controlled oscillator configured to output an intermediate frequency for the intermediate frequency signal; and
a fast search numerically controlled oscillator (FSNCO) outputting pulses at a preset period, wherein in response to the output pulses of the FSNCO:
the decimator is further configured to generate a new output sample;
the correlator is further configured to shift a shifted array of input samples to include the new output sample;
the correlator is further configured to shift a shifted array of PRN code elements to include a current state of a PRN code generator's output;
the correlator is further configured to copy the shifted array of PRN code elements to non-shifted array of PRN code elements one time during S pulses of the fast search numerically controlled oscillator;
the correlator is further configured to calculate a new convolution value and a coherent metric of the new convolution value;
a corrector is configured to compare the coherent metric of the new convolution value with the stored result, and, if the new convolution value is greater than the stored result, then the new convolution value is stored instead of the stored result; and
a fast search module is configured to determine an availability of a signal with a known PRN code and its parameters in the received radio signal once every S*k pulses of the fast search numerically controlled oscillator for at least one value of the stored result, wherein S*k is a searching period, S of the searching period is a searching window, and k of the searching period is a multiplier.

2. The apparatus of claim 1, further comprising:
a Doppler numerically controlled oscillator (DopNCO) configured to output a Doppler phase once in S pulses of the FSNCO;
at least D−1 digital phase shifters, where D−1 is an even integer, rotating the new convolution value into a phase proportional to the phase at the DopNCO output;
the memory unit further configured to store D*S values, wherein for each pulse of the FSNCO the following operations are performed:
in each of D−1 phase shifters, the value output from the correlator is rotated into a phase proportional to the phase of DopNCO output to generate D−1 rotated phase convolution results;
obtained D−1 rotated convolution results as well as a non-rotated convolution result are added to previous values in the memory unit configured to store D*S values, and the obtained D results of adding are stored in the memory at the same address; and
the coherent metrics of the new D convolution values are calculated according to the result of adding the rotated/non-rotated convolution result and the previous value in the memory unit configured to store D*S values.

3. The apparatus of claim 2, wherein,
at Kth period of S pulses, the availability of a signal with a known PRN code and its parameters in the received radio signals is determined among D*S coherent metrics.

4. The apparatus of claim 1, further comprising:
a reload generator, the reload generator storing the state of code generator, and at S*k+1 pulse when at the end of the incoherent period, the reload generator loads the stored state of the code generator into the code generator.

5. The apparatus of claim 1, further comprising:
a coherent counter; and
a not-coherent counter,
wherein the coherent counter counts K periods of S pulses, and the not-coherent counter can be used to count a period of the coherent counter, wherein at the last S pulses before the not-coherent counter is incremented, each D coherent metrics are converted to values to be added to D not-coherent metrics and the updated not-coherent metrics and the values obtained are stored in the memory unit.

6. The apparatus of claim 5, wherein, when at the end of the incoherent period and when the coherent counter counts K periods of S pulses, a fast search module detects/sort several max values in not-coherent metrics S*D for each Doppler frequency separately, and saves them, saved values read by a CPU, the saved values include not-coherent metrics, coherent metrics, and delay number.

7. The apparatus of claim 1, further comprising:
a control accumulator comprising N cyclically shift registers that are moved forward at a rate of the FSNCO, the input to the control accumulator set to 0 based on a configuration.

8. The apparatus of claim 1, wherein addition of estimates during data sorting comprises the results of Doppler metrics during the period S*k and Doppler metrics for each offset are separately sorted.

9. The apparatus of claim 1, wherein at the end of the incoherent period and when the coherent counter counts K periods of S pulses, all not-coherent metric are added, and the result being read by a CPU.

10. A method comprising:
receiving radio signals at an antenna, the radio signals having a known PRN code;
transmitting the radio signals from the antenna to an RF path;
transmitting the signals from the RF path using an intermediate frequency signal;
sampling the intermediate frequency signal at an ADC, the sampling at a period of pulses output from a numerically controlled oscillator of PRN elements;
generating, by a digital mixer, a sampled signal at a zero frequency based on signals received from the ADC;
transmitting outputs from a decimator in response to the decimator receiving the sampled signal at the zero frequency to a shifted array of inputs;
calculating, at a correlator, a convolution of the shifted array inputs received from the decimator via a pair of quantization units with a non-shifted array of PRN code elements;
storing a result of a value output from the correlator in a first memory unit;
calculating, at a code generator, a new element according to pulses output from the numerically controlled oscillator;
outputting, from a fast search numerically controlled oscillator (FSNCO), pulses at a preset period;
generating, by the decimator, a new output sample based on the pulses at the preset period;
shifting, by the correlator, a shifted array of input samples to include the new output sample;
shifting, by the correlator, a shifted array of PRN code elements to include a current state of a PRN code generator's output
copying, by the correlator, the shifted array of PRN code elements to non-shifted array of PRN code elements one time during S pulses of the numerically controlled oscillator;
calculating, by the correlator, a new convolution value and a coherent/not-coherent metric of the new convolution value;
comparing, by a corrector, a metric based on calculated not-coherent metric value with a stored result, and, if the new metric value is greater than the stored result, then the new convolution value is stored instead of the stored result; and
determining, by a fast search module, an availability of a signal with a known PRN code and its parameters in the received radio signal once every S*k pulses of Fast Search NCO for at least one value of the stored result,
wherein S*k is a searching period, S of the searching period is a searching window, and k of the searching period is a multiplier.

11. The method of claim 10, further comprising:
outputting a Doppler phase once in S pulses of the FSNCO from a Doppler numerically controlled oscillator (DopNCO);
rotating, by at least D−1 digital phase shifters, the new convolution value into a phase proportional to the phase at the DopNCO output;
storing D*S values in a the memory unit;
rotating, in each of D−1 phase shifters, for each pulse of the FSNCO, the value output from the correlator into a phase proportional to the phase of Doppler NCO output to generate D−1 rotated phase convolution results;
adding, in the memory unit, for each pulse of the FSNCO, the obtained D−1 rotated convolution results as well as a non-rotated convolution result to previous values in the memory unit, and the obtained D results of adding are stored in the memory unit at the same address; and
calculating, for each pulse of the FSNCO, the coherent metrics of the new results.

12. The method of claim 11, wherein,
obtained D−1 metrics based on the obtained D−1 rotated convolution results, are input to the memory unit configured to store D*S values;
obtained metrics based on non-rotated/rotated results are input to the memory unit configured to store D*S values for storing the result; and
once every S*k pulses, the availability of a signal with a known PRN code and its parameters in the received radio signals is determined.

13. The method of claim 10, further comprising:
storing, at a reload generator, the state of code generator; and
loading, at S*k+1 pulse when at the end of the incoherent period, the stored state of the code generator from reload generator into the code generator.

14. The method of claim 10, further comprising:
counting K periods of S pulses, the K periods being associated as coherent integration period;
counting a number of coherent integration periods, the number of coherent integration periods being associated as not-coherent integration period; and
converting D coherent metrics to values to be added to D not-coherent metrics, each converting being performed upon each pulse from the last S pulses before end of each coherent integration period, the updated not-coherent metrics being stored in the memory unit configured to store D*S values.

15. The method of claim 14, wherein at the end of not-coherent integration period several max values among S*D not-coherent metrics for each Doppler frequency are separately selected, the selected values being read by a CPU, the saved values include not-coherent metrics, coherent metrics, and delay number.

16. The method of claim 10, further comprising:
moving N cyclically shift registers forward at a rate of the FSNCO, wherein the input to a control accumulator is set to zero based on a configuration.

17. The method of claim 10, wherein addition of estimates during data sorting comprises the results of Doppler metrics during the period S*k and Doppler metrics for each offset are separately sorted.

* * * * *